US012413927B2

(12) United States Patent
Jansson Toftgård et al.

(10) Patent No.: US 12,413,927 B2
(45) Date of Patent: Sep. 9, 2025

(54) EFFICIENT HEAD-RELATED FILTER GENERATION

(71) Applicant: Telefonaktiebolaget LM Ericsson (publ), Stockholm (SE)

(72) Inventors: Tomas Jansson Toftgård, Uppsala (SE); Rory Gamble, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 286 days.

(21) Appl. No.: 18/014,958

(22) PCT Filed: Jul. 7, 2021

(86) PCT No.: PCT/EP2021/068729
§ 371 (c)(1),
(2) Date: Jan. 6, 2023

(87) PCT Pub. No.: WO2022/008549
PCT Pub. Date: Jan. 13, 2022

(65) Prior Publication Data
US 2023/0336938 A1 Oct. 19, 2023

Related U.S. Application Data

(60) Provisional application No. 63/048,863, filed on Jul. 7, 2020.

(51) Int. Cl.
*H04S 7/00* (2006.01)
*H04S 1/00* (2006.01)

(52) U.S. Cl.
CPC .............. *H04S 7/304* (2013.01); *H04S 1/007* (2013.01); *H04S 2400/11* (2013.01); *H04S 2420/01* (2013.01)

(58) Field of Classification Search
CPC ...... H04S 7/304; H04S 1/007; H04S 2400/11; H04S 2420/01
(Continued)

(56) References Cited

U.S. PATENT DOCUMENTS 10,251,014 B1 * 4/2019 Lyren ...................... H04S 3/008
2005/0147261 A1 * 7/2005 Yeh .......................... H04R 3/12 381/26

(Continued)

FOREIGN PATENT DOCUMENTS

CN 105 786 764 A 7/2016
WO 2021074294 A1 4/2021

OTHER PUBLICATIONS

Kasuga, et al., "IIR filter design for approximation of head-related transfer function", The Journal of the Acoustical Society of Japan, vol. 54, No. 7, Acoustical Society of Japan, Jul. 1, 1998 (8 pages) (English abstract attached).

(Continued)

*Primary Examiner* — Vivian C Chin
*Assistant Examiner* — Douglas J Suthers
(74) *Attorney, Agent, or Firm* — Rothwell, Figg, Ernst & Manbeck, P.C.

(57) ABSTRACT

A method for generating a head-related (HR) filter for audio rendering is provided. The method comprises generating HR filter model data which indicates an HR filter model, and based on the generated HR filter model data, (i) sampling one or more basis functions and (ii) generating first basis function shape data and shape metadata. The method further comprises providing the generated first basis function shape data and the shape metadata for storing in one or more storage mediums.

14 Claims, 14 Drawing Sheets

(58) Field of Classification Search
USPC .......................................................... 381/303
See application file for complete search history.

(56) References Cited

U.S. PATENT DOCUMENTS

| | | | | |
|---|---|---|---|---|
| 2016/0227338 | A1* | 8/2016 | Oh | H04S 3/008 |
| 2017/0339504 | A1* | 11/2017 | Bharitkar | H04S 3/004 |
| 2019/0215637 | A1* | 7/2019 | Lee | H04S 7/304 |

OTHER PUBLICATIONS

Nishino et al. "Interpolating head related transfer functions in the median plane" Applications of Signal Processing to Audio and Acoustics, 1999 IEEE Workshop on New Paltz, Ny, USA Oct. 17-20, 1999, Oct. 17, 1999; Oct. 17, 1999—Oct. 20, 1999 Piscataway, NJ, USA, IEEE, US, pp. 167-170.
Kie, Bo-Sun "Recovery of individual head-related transfer functions from a small set of measurements" The Journal of the Acoustical Society of America, vol. 132, No. 1, Jul. 1, 2012, pp. 282-294.
International Search Report and the Written Opinion of the International Searching Authority, issued in corresponding International Application No. PCT/EP2021/068729, dated Oct. 10, 2021, 11 pages.
Carlile et al. "Continuous Virtual Auditory Space Using Hrtf Interpolation: Acoustic & Psychophysical Errors" 2000 Proceedings of the First IEEE Pacific-Rim Conference on Multimedia, pp. 220-223.
Torres et al. "HRTF Interpolation in the Wavelet Transform Domain" 2009 IEEE Workshop on Applications of Signal Processing to Audio and Acoustics Oct. 18-21, 2009, New Paltz, NW, 4 pages.

* cited by examiner

θ Elevation angle

ϕ Azimuth angle compact representation of B-spline basis functions of FIGS. 3(a)-3(b).

compact representations of basis functions of Fig. 5

Left HR Filter

Right HR Filter

EFFICIENT HEAD-RELATED FILTER GENERATION

CROSS REFERENCE TO RELATED APPLICATION(S)

This application is a 35 U.S.C. § 371 National Phase Entry Application of PCT/EP2021/068729, filed Jul. 7, 2021, designating the United States, the disclosure of which claims the benefit of U.S. Provisional Application No. 63/048,863, filed Jul. 7, 2020, the disclosures of which are incorporated herein in their entirety by this reference.

TECHNICAL FIELD

Disclosed are embodiments related to methods and systems for efficient head-related filter generation.

BACKGROUND

The human auditory system is equipped with two ears that capture the sound (audio) waves propagating towards the listener. In this disclosure, the word "sound" and the word "audio" are used interchangeably. FIG. 1 shows a sound wave propagating towards a listener from a direction of arrival (DOA) specified by a pair of elevation and azimuth angles in the spherical coordinate system. On the propagation path towards the listener, each sound wave interacts with the upper torso, the head, the outer ears of the listener, and the matter surrounding the listener before reaching the left and right eardrums of the listener. This interaction results in temporal and spectral changes of the sound waveforms reaching the left and right eardrums, some of which are DOA-dependent. The human auditory system has learned to interpret these changes to infer various spatial characteristics of the sound wave itself as well as the acoustic environment in which the listener finds himself/herself. This capability is called spatial hearing, which concerns how listeners evaluate spatial cues embedded in a binaural signal, i.e., the sound signals in the right and the left ear canals, to infer the location of an auditory event elicited by a sound event (a physical sound source) and acoustic characteristics caused by the physical environment (e.g., a small room, a tiled bathroom, an auditorium, a cave) the listeners are in. This human capability—i.e., spatial hearing—can in turn be exploited to create a spatial audio scene by reintroducing the spatial cues in the binaural signal, which would lead to a spatial perception of a sound.

The main spatial cues include (1) angular-related cues: binaural cues—i.e., the interaural level difference (ILD) and the interaural time difference (ITD)—and monaural (or spectral) cues; and (2) distance-related cues: intensity and direct-to-reverberant (D/R) energy ratio. A mathematical representation of the short-time (e.g., 1-5 milliseconds) DOA-dependent or angular-related temporal and spectral changes of the waveform are so-called head-related (HR) filters. The frequency domain (FD) representations of HR filters are so-called head-related transfer functions (HRTFs), and the time domain (TD) representations of HR filters are so-called head-related impulse responses (HRIRs). FIG. 2 shows a sound wave propagating towards a listener and the differences in sound paths to the ears, which give rise to ITD. FIG. 14 shows an example of spectral cues (HR filters) of the sound wave shown in FIG. 2. The two plots shown in FIG. 14 illustrate the magnitude responses of a pair of HR filters obtained at an elevation angle (θ) of 0 degrees and an azimuth angle (ϕ) of 40 degrees. This data is from Center for Image Processing and Integrated Computing (CIPIC) database: subject-ID 28. The database is publicly available, and can be accessed from the link https://www.ece.ucdavis.edu/cipic/spatial-sound/hrtf-data/.

An HR filter based binaural rendering approach has been gradually established, where a spatial audio scene is generated by directly filtering audio source signals with a pair of HR filters of desired locations. This approach is particularly attractive for many emerging applications such as virtual reality (VR), augmented reality (AR), or mixed reality (MR) (which are sometimes collectively called extended reality (XR)), and mobile communication systems in which headsets are commonly used.

HR filters are often estimated from measurements as the impulse response of a linear dynamic system that transforms an original sound signal (i.e., an input signal) into left and right ear signals (i.e., output signals) that can be measured inside the ear channels of a listening subject at a predefined set of elevation and azimuth angles on a spherical surface of constant radius from the listening subject (e.g., an artificial head, a manikin, or a human subject). The estimated HR filters are often provided as finite impulse response (FIR) filters and can be used directly in that format. To achieve an efficient binaural rendering, a pair of HRTFs may be converted to Interaural Transfer Function (ITF) or modified ITF to prevent abrupt spectral peaks. Alternatively, HRTFs may be described by a parametric representation. Such parameterized HRTFs may easily be integrated with parametric multichannel audio coders (e.g., MPEG surround and Spatial Audio Object Coding (SAOC)).

To discuss the quality of different spatial audio rendering techniques, the concept of Minimum Audible Angle (MAA) may be useful. MAA characterizes the sensitivity of the human auditory system to an angular displacement of a sound event. Regarding localization in azimuth, studies have reported that MAA is the smallest in the front and back (about 1 degree), and much greater for lateral sound sources (about 10 degrees) for a broadband noise burst. MAA in the median plane increases with elevation. As small as 4 degrees of MAA on average in elevation has been reported with broadband noise bursts.

Spatial rendering of audio, which leads to a convincing spatial perception of a sound at an arbitrary location in a space requires a pair of HR filters representing a location within the MAA of the corresponding location. If the discrepancy in the angle for the HR filters is below a limit (i.e., if the angle for the HR filters is within the MAA), then the discrepancy is not noticed by the listener. If, however, the discrepancy is greater than this limit (i.e., if the angle for the HR filters is outside the MAA), such larger location discrepancy may lead to a correspondingly more noticeable inaccuracy in the position which the listener perceives.

SUMMARY

HR filter measurements are taken at finite measurement locations but audio rendering may require determining HR filters for any possible location on the sphere (e.g., 150 in FIG. 1) surrounding the listener. Thus, a method of mapping is required to convert from discrete measurements made at the finite measurement locations to the continuous spherical angle domain. Several methods for such mapping exist. The method includes directly using the nearest available measurement, using interpolation methods, and/or using modelling techniques.

1. Direct Use of the Nearest Neighboring Measurement Point

The simplest technique for the mapping is to use an HR filter at the closest (i.e., the nearest) point among a set of measurement points. Some computational work may be required to determine the nearest neighboring measurement point and such work can become nontrivial for an irregularly-sampled set of measurement points on the sphere surrounding the listener. For a general object location, there may be some angular error between the desired filter location (corresponding to the object location) and the closest available HR filter measurement point. For a sparsely-sampled set of HR filter measurements, this may lead to a noticeable error in the object location. The error may be reduced or effectively eliminated when a more densely-sampled set of measurement points is used. For moving objects, the HR filter changes in a stepwise fashion which does not correspond to the intended smooth movement.

Generally, densely-sampled measurements of HR filters are difficult to take for human subjects because they require that the subjects must sit still during data collection and small accidental movements of the subjects limit the angular resolution that can be achieved. Also, the measurement process is time-consuming for both subjects and technicians. Instead of taking such densely-sampled measurements, it may be more efficient to infer spatial-related information about missing HR filters given a sparsely-sampled HR filter dataset (as explained below). Densely-sampled HR filter measurements are easier to capture for dummy heads, but the resulting HR filter set is not always well-suited to all listeners, sometimes leading to the perception of inaccurate or ambiguous object locations.

2. Interpolation Between Neighboring Measurement Points

If the sample measurement points are not sufficiently densely spaced, interpolation between neighboring measurement points can be used to generate an approximate filter for the DOA that is needed. The interpolated filter varies in a continuous manner between the discrete sample measurement points, avoiding abrupt changes that may occur when the above method (i.e., the method 1) is used. This interpolation method incurs additional complexity in generating interpolated HR filter values, with the resulting HR filter having a broadened (less point-like) perceived DOA due to mixing of filters from different locations. Also, measures need to be taken to prevent phasing issues that arise from mixing the filters directly, which can add additional complexity.

3. Modelling-Based Filter Generation

More advanced techniques can be used to construct a model for the underlying system, which gives rise to the HR filters and how they vary with angle. Given a set of HR filter measurements, model parameters are tuned to reproduce the measurements with minimal error and thereby create a mechanism for generating HR filters not only at the measurement locations but more generally as a continuous function of the angle space.

Other methods exist for generating an HR filter as a continuous function of DOA, which do not require an input set of measurements but instead use high-resolution 3D scans of a listener's head and ears to model the wave propagation around the listener's head to predict the behavior of the HR filter.

A category of HR filter models which make use of weighted basis functions and vectors to represent HR filters is presented below.

3.1. HR Filter Model Using Weighted Basis Vectors—a Mathematical Framework

Consider a model for an HR filter with the following form:

$$\hat{h}(\theta, \phi) = \sum_{n}^{N} \sum_{k}^{K} \alpha_{n,k} F_{k,n}(\theta, \phi) e_k, \tag{1}$$

where $\hat{h}(\theta, \phi)$ is the estimated HR filter, a vector of length K, for a specific $(\theta, \phi)$ angle, $\alpha_{n,k}$ are a set of scalar weighting values which are independent of angles $(\theta, \phi)$, $F_{k,n}(\theta, \phi)$ are a set of scalar-valued functions which are dependent upon angles $(\theta, \phi)$, $e_k$ are a set of orthogonal basis vectors which span the K-dimensional space of the $\hat{h}(\theta, \phi)$ filters.

The model functions $F_{k,n}(\theta, \phi)$ are determined as a part of a model design and are usually chosen such that the variation of the HR filter set over the elevation and azimuth dimensions is well-captured. With the model functions specified, the model parameters $\alpha_{n,k}$ can be estimated with data fitting methods such as minimized least squares methods.

It is not uncommon to use the same modelling functions for all of the HR filter coefficients, which results in a particular subset of this type of model where the model functions $F_{k,n}(\theta, \phi)$ are independent of position k within the filter:

$$F_{k,n}(\theta,\phi) = F_n(\theta,\phi), \forall k. \tag{2}$$

The model can then be expressed as:

$$\hat{h}(\theta, \phi) = \sum_{n}^{N} F_n(\theta, \phi) \sum_{k}^{K} \alpha_{n,k} e_k. \tag{3}$$

In one embodiment, the $e_k$ basis vectors are the natural basis vectors $e_1=[1, 0, 0, \ldots 0]$, $e_2=[0, 1, 0, \ldots 0]$, ... which are aligned with the coordinate system being used. For compactness, when the natural basis vectors are used, it may be rewritten that:

$$\sum_{k}^{K} \alpha_{n,k} e_k = [\alpha_{n,1}, \alpha_{n,2}, \ldots, \alpha_{n,K}] = \alpha_n, \tag{4}$$

where the $\alpha_n$ are vectors of length K. This leads to the equivalent expression for the model:

$$\hat{h}(\theta, \phi) = \sum_{n}^{N} F_n(\theta, \phi) \alpha_n. \tag{5}$$

That is, once the parameters $\alpha_{n,k}$ have been estimated, $\hat{h}$ may be expressed as a linear combination of fixed basis vectors $\alpha_n$, where the angular variation of the HR filter is captured in the weighting values $F_n(\theta, \phi)$.

An individual filter coefficient k is accordingly obtained as:

$$\hat{h}_k(\theta, \phi) = \sum_n^N F_n(\theta, \phi)\alpha_{n,k}. \quad (6)$$

This equivalent expression is a compact expression in the case where the unit basis vectors are the natural basis vectors. The following method, however, may be applied (without this convenient notation) to a model which uses any choice of basis vectors (including non-orthogonal basis vectors as well as orthogonal basis vectors) in any domain. Other embodiments of the same underlying modelling technique would be a different choice of basis vectors in the time domain (e.g., Hermite polynomials, sinusoids, etc.) or in a domain other than the time domain, such as the frequency domain (via e.g., a Fourier transform) or any other domain in which it is natural to express the HR filters.

$\hat{h}$ is the result of the model evaluation specified in the equation (5), and should be similar to a measurement of h at the same location. For a test point $(\theta_{test}, \phi_{test})$ where a real measurement of h is known, $h(\theta_{test}, \phi_{test})$ and $\hat{h}(\theta_{test}, \phi_{test})$ can be compared to evaluate the quality of the model. If the model is deemed to be accurate, it can be used to generate an estimate $\hat{h}$ for some general point which is not necessarily one of the points where h has been measured.

An equivalent matrix formulation of the equation (5) is:

$$\hat{h}(\theta,\phi)=f(\theta,\phi)\alpha \quad (7)$$

where $f(\theta, \phi)$=a row vector of weighting values for one ear, having length N, i.e., $f(\theta, \phi)=[F_1(\theta, \phi), F_2(\theta, \phi), \ldots, F_N(\theta, \phi)]$, and $\alpha$=the basis functions for one ear, organized as rows in a matrix, N rows by K columns, i.e., $$\alpha = \begin{bmatrix} \alpha_1 \\ \alpha_2 \\ \vdots \\ \alpha_N \end{bmatrix}$$

As described in WO 2021/074294 (which is hereby incorporated by reference), B-spline functions are suitable basis functions for HR filter modeling for elevation angles θ and azimuth angles ϕ. This indicates that functions $F_n(\theta, \phi)$ may be determined as:

$$F_n(\theta,\phi)=\Theta_p(\theta)\Phi_{p,q}(\phi) \quad (8)$$

with $n=(p-1)Q_p+q$ for $p=1, \ldots, P$ and $q=1, \ldots, Q_p$. P is the number of elevation basis functions and $Q_p$ is the number of azimuth basis functions which may vary for different elevations p. For elevation standard B-spline functions may be used, while for the azimuth, periodic B-spline functions may be used.

As discussed above, the three types of method for inferring an HR filter on a continuous domain of angles have varying levels of computational complexity and of perceived location accuracy. Direct use of the nearest neighboring measurement point is the simplest but requires densely-sampled measurements of HR filters, which are not easy to obtain and usually result in large amounts of data. In contrast, the methods using models for HR filters have the advantage that they can generate an HR filter with point-like localization properties that smoothly vary as the DOA changes. These methods can also represent the set of HR filters in a more compact form, thus requiring fewer resources for transmission and/or storage (including storage in a program memory when they are in use). These advantages come at the cost of numerical complexity (the model must be evaluated to generate an HR filter before the filter can be used). Such complexity is a problem for the rendering systems with limited calculation capacity as such limited capacity limits the number of audio objects that may be rendered, for example, in a real-time audio scene.

In spatial audio renderers, it is desirable to be able to evaluate an HR filter for any elevation-azimuth angle in real-time from a model evaluation equation such as the equation (5). Thus, the HR filter evaluation specified in the equation (5) needs to be executed very efficiently.

Repeated evaluation of HR filter models suffers from the complexity not only in evaluating the model outputs but also in evaluating the basis functions of the models. Additionally, the contribution of a certain basis function might be insignificant (e.g., zero) for the evaluation of a certain HR filter direction. This means that the filter evaluation becomes unnecessarily complex. On the other hand, it is of high importance that memory consumption needed for the HR filter evaluation is not increased substantially, especially for utilization in mobile devices where both memory and computational complexity capabilities are limited.

From the B-spline basis functions (e.g., described in WO 2021/074294), it can be seen that the filter evaluation described in the equation (5) will include the determination of $F_n(\theta, \phi)$ with $P \cdot Q_p$ multiplications per elevation p and further $P \cdot Q_p$ multiplications and summations per coefficient n in the evaluation of $\Sigma_n^N F_n(\theta, \phi)\alpha_{n,k}$. These operations are subsequently executed per every filter coefficient k which all together results in a significant number of operations for the evaluation of the HR filter $\hat{h}(\theta, \phi)$.

FIGS. 3(*a*) and 3(*b*) show periodic B-spline basis functions.

FIG. 3(*a*) shows an example of 4 periodic B-spline basis functions for a [0,360] degree modeling range. Knot points are at 0 (=360), 90, 180 and 270 degrees. In this example all basis functions within each segment between the knot points are non-zero.

FIG. 3(*b*) shows an example of 8 periodic B-spline basis functions for a [0,360] degree modeling range. Knot points are at 0 (=360), 45, . . . , 315 degrees. In this case the non-zero parts of each basis function cover only half of the modeling range, i.e. 180 degrees only.

As shown in FIGS. 3(*a*) and 3(*b*), for certain B-spline configurations, only a few B-spline functions are non-zero for a certain direction (θ, ϕ). For example, the B-spline function starting at 0 degrees in FIG. 3(*b*) may become zero for any angle between 180-360 degrees. This means that the HR filter evaluation of the equation (5), may involve a significant number of multiplication and summations with zero components. The result is a complexity inefficient model-based HR filter evaluation.

According to some embodiments of this disclosure, the problem of inefficient HR filter evaluation may be solved by a memory efficient structured representation for a complexity efficient HR filter evaluation and/or avoidance of multiplications and additions by zero-valued components.

Accordingly, in one aspect there is provided a method for generating a head-related (HR) filter for audio rendering. The method comprises generating HR filter model data which indicates an HR filter model. Generating the HR filter model data comprises selecting at least one set of one or more basis functions. The method also comprises based on the generated HR filter model data, (i) sampling said one or more basis functions and (ii) generating first basis function shape data and shape metadata. The first basis function shape data identifies one or more compact representations of said one or more basis functions, and the shape metadata includes information about the structure of said one or more compact representations in relation to said one or more basis functions. The method further comprises providing the first generated basis function shape data and the shape metadata for storing in one or more storage mediums.

In some embodiments, the method may further comprise detecting an occurrence of a triggering event. Such triggering event may indicate that a head-related (HR) filter for audio rendering is to be generated, which may be induced from the audio renderer when a head-related (HR) filter is requested, e.g., for rendering a frame of audio or for preparing the rendering by generation of a head-related (HR) filter stored in memory for subsequent use. In some embodiments, the triggering event is just a decision to retrieve basis function shape data and/or shape metadata from one or more storage mediums. The method may further comprise as a result of detecting the occurrence of the triggering event, outputting second basis function shape data and the shape metadata for the audio rendering.

In another aspect there is provided a method for generating a head-related (HR) filter for audio rendering. The method comprises obtaining shape metadata which indicates whether to obtain a converted version of one or more compact representations of one or more basis functions. The method further comprises obtaining basis function shape data which identifies (i) said one or more compact representations of said one or more basis functions or (ii) the converted version of said one or more compact representations of said one or more basis functions. The method further comprises based on the obtained shape metadata and the obtained basis function shape data, generating the HR filter by using (i) said one or more compact representations of said one or more basis functions or (ii) the converted version of said one or more compact representations of said one or more basis functions.

In another aspect there is provided an apparatus for generating a head-related (HR) filter for audio rendering. The apparatus is adapted to generate HR filter model data which indicates an HR filter model. Generating the HR filter model data comprises selecting at least one set of one or more basis functions. The apparatus is further adapted to, based on the generated HR filter model data, (i) sample said one or more basis functions and (ii) generate first basis function shape data and shape metadata. The first basis function shape data identifies one or more compact representations of said one or more basis functions, and the shape metadata includes information about the structure of said one or more compact representations in relation to said one or more basis functions. The apparatus is further adapted to provide the generated first basis function shape data and the shape metadata for storing in one or more storage mediums.

The apparatus is further adapted to detect an occurrence of a triggering event and as a result of detecting the occurrence of the triggering event, outputting second basis function shape data and the shape metadata for the audio rendering. Such triggering event may indicate that a head-related (HR) filter for audio rendering is to be generated, which may be induced from the audio renderer when a head-related (HR) filter is requested, e.g., for rendering a frame of audio or for preparing the rendering by generation of a head-related (HR) filter stored in memory for subsequent use. In some embodiments, the triggering event is just a decision to retrieve basis function shape data and/or shape metadata from one or more storage mediums. In one embodiment, the apparatus comprises processing circuitry and a storage unit storing instructions for configuring the apparatus to perform any of the processes disclosed herein.

In another aspect there is provided an apparatus for generating a head-related (HR) filter for audio rendering. The apparatus is adapted to obtain shape metadata which indicates whether to obtain a converted version of one or more compact representations of one or more basis functions. The apparatus is further adapted to obtain basis function shape data which identifies (i) said one or more compact representations of said one or more basis functions or (ii) the converted version of said one or more compact representations of said one or more basis functions. The apparatus is further adapted to, based on the obtained shape metadata and the obtained basis function shape data, generate the HR filter by using (i) said one or more compact representations of said one or more basis functions or (ii) the converted version of said one or more compact representations of said one or more basis functions.

In another aspect there is provided a computer program comprising instructions which when executed by processing circuitry causes the processing circuitry to perform the above described method. In one embodiment, there is provided a carrier containing the computer program wherein the carrier is one of an electronic signal, an optical signal, a radio signal, and a computer readable storage medium.

Embodiments of this disclosure enables a perceptually transparent (non-audible) optimization for a spatial audio renderer utilizing modelling-based HR filters, for example, for rendering of a mono source at a position $(r, \theta, \phi)$ in relation to a listener, where r is the radius and $(\theta, \phi)$ are the elevation and azimuth angles respectively.

BRIEF DESCRIPTION OF THE DRAWINGS

The accompanying drawings, which are incorporated herein and form part of the specification, illustrate various embodiments.

DETAILED DESCRIPTION

Some embodiments of this disclosure are directed to a binaural audio renderer. The renderer may operate standalone or in conjunction with an audio codec. Potentially compressed audio signals and their related metadata (e.g., the data specifying the position of a rendered audio source) may be provided to the audio renderer. The renderer may also be provided with head-tracking data obtained from a head-tracking device (e.g., inside-out inertia-based tracking device(s) such as an accelerometer, a gyroscope, a compass, etc., or outside-in based tracking device(s) such as LIDARs). Such head-tracking data may impact the metadata (i.e., the rendering metadata) used for rendering (e.g., such that the audio object (source) is perceived at a fixed position in the space independently of the listener's head rotation). The renderer also obtains HR filters to be used for binauralization. The embodiments of this disclosure provide an efficient representation and method for HR filter generation based on weighted basis vectors according to WO 2021/074294 or the equation (1).

The scalar-valued function $F_n(\theta, \phi)$ is assumed to be a function $g(\cdot)$ of a set of P elevation basis functions $\Theta_p(\theta)$, $p=0, \ldots, P-1$, and a set of Q azimuth basis functions $\Phi_q(\phi)$. As described in WO 2021/074294, the set of azimuth or elevation basis functions may also vary for different p or q (e.g., varying the number of azimuth basis functions $\Phi_{p,q}(\phi)$ depending on elevation function index p, which means that the number of azimuth basis functions $Q_p$ depends on p). In one embodiment, $F_n(\theta, \phi)$ may be selected as the product of $\Theta_p(\theta)$ and $\Phi_{p,q}(\phi)$. In other words, $$F_n(\theta,\phi)=g(\Theta_p(\theta),\Phi_{p,q}(\phi))=\Theta_p(\theta)\Phi_{p,q}(\phi) \quad (9)$$

Some embodiments of this disclosure are based on efficient structures of HR filter model(s) and perceptually based spatial sampling of the elevation and azimuth basis functions $\Theta_p(\theta)$ and $\Phi_q(\phi)$.

1. HR Filter Model Design

First, the HR filter model (corresponding to the equation (1)) may be designed by a selection of an HR filter length K, the number of elevation basis functions P, the number of azimuth basis functions $Q_p$, and the sets of basis functions $\Theta_p(\theta)$ and $\Phi_{p,q}(\phi)$. Each basis function may be smooth and put more weight to certain segments (angles) of the elevation and azimuth modelling ranges (e.g., to certain parts of [−90, . . . ,90] and [0, . . . ,360] respectively). Thus, for certain segments of the modelling range, a certain basis function may be zero.

Figure 1:
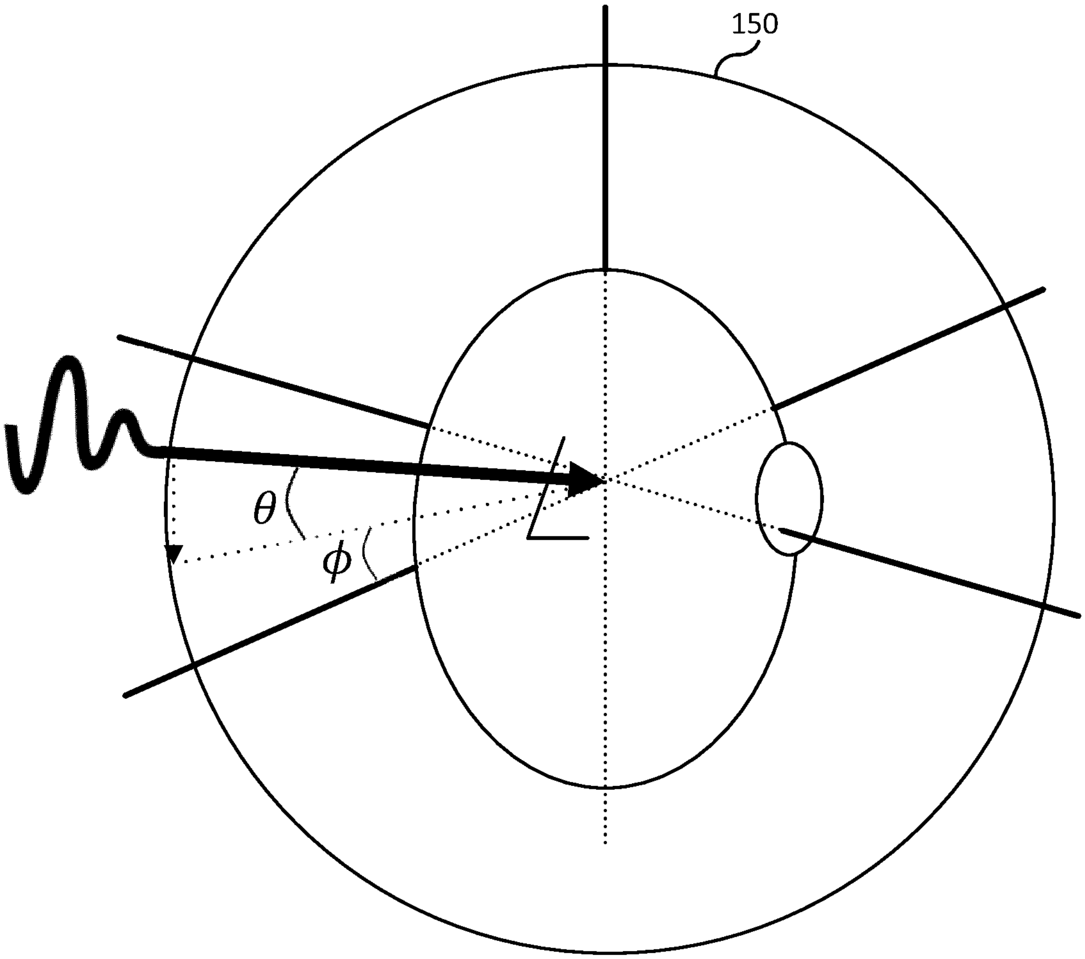
FIG. 1 shows propagation of a sound wave from a source located at angles θ, ϕ towards a listener.
Figure 2:
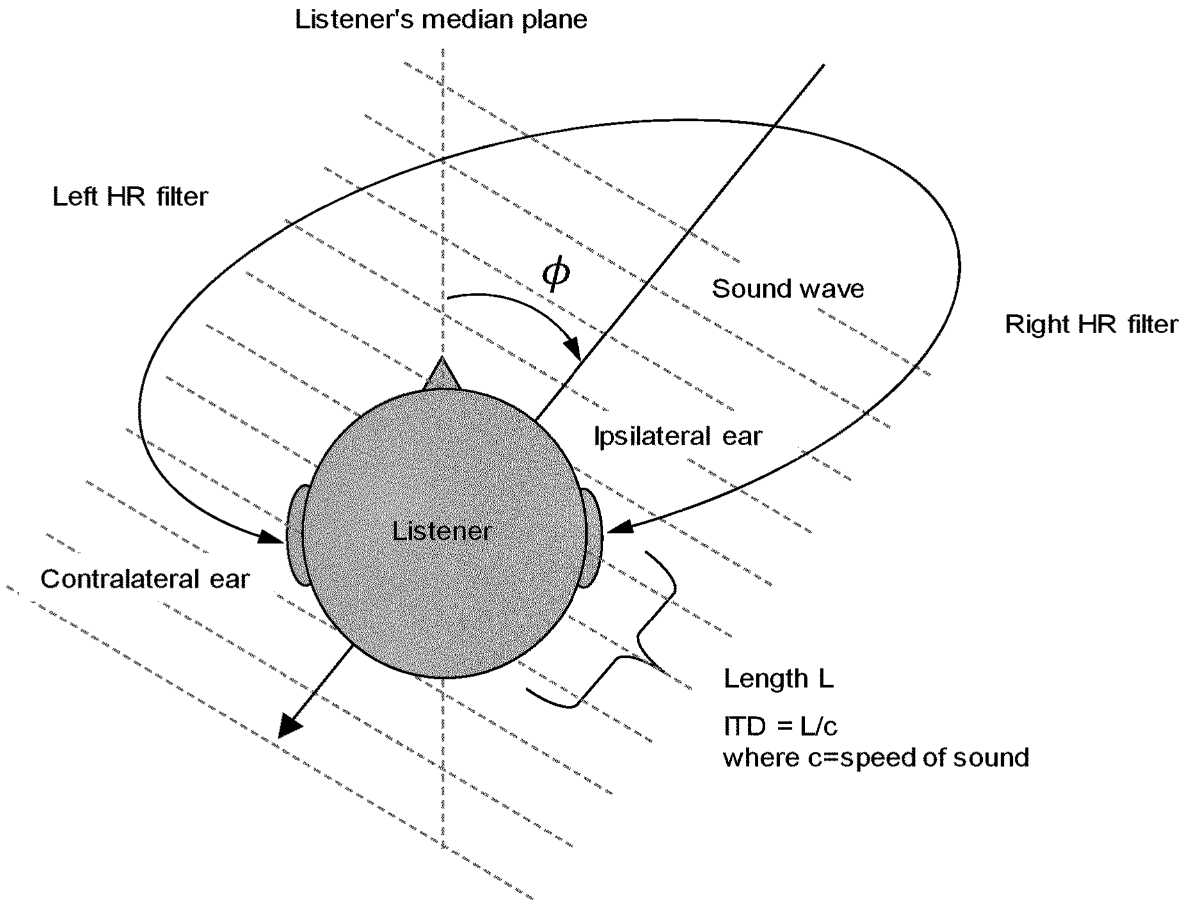
FIG. 2 shows a sound wave propagating towards a listener, interacting with the head and ears, and the resulting ITD.
Figures 3A, 3B:
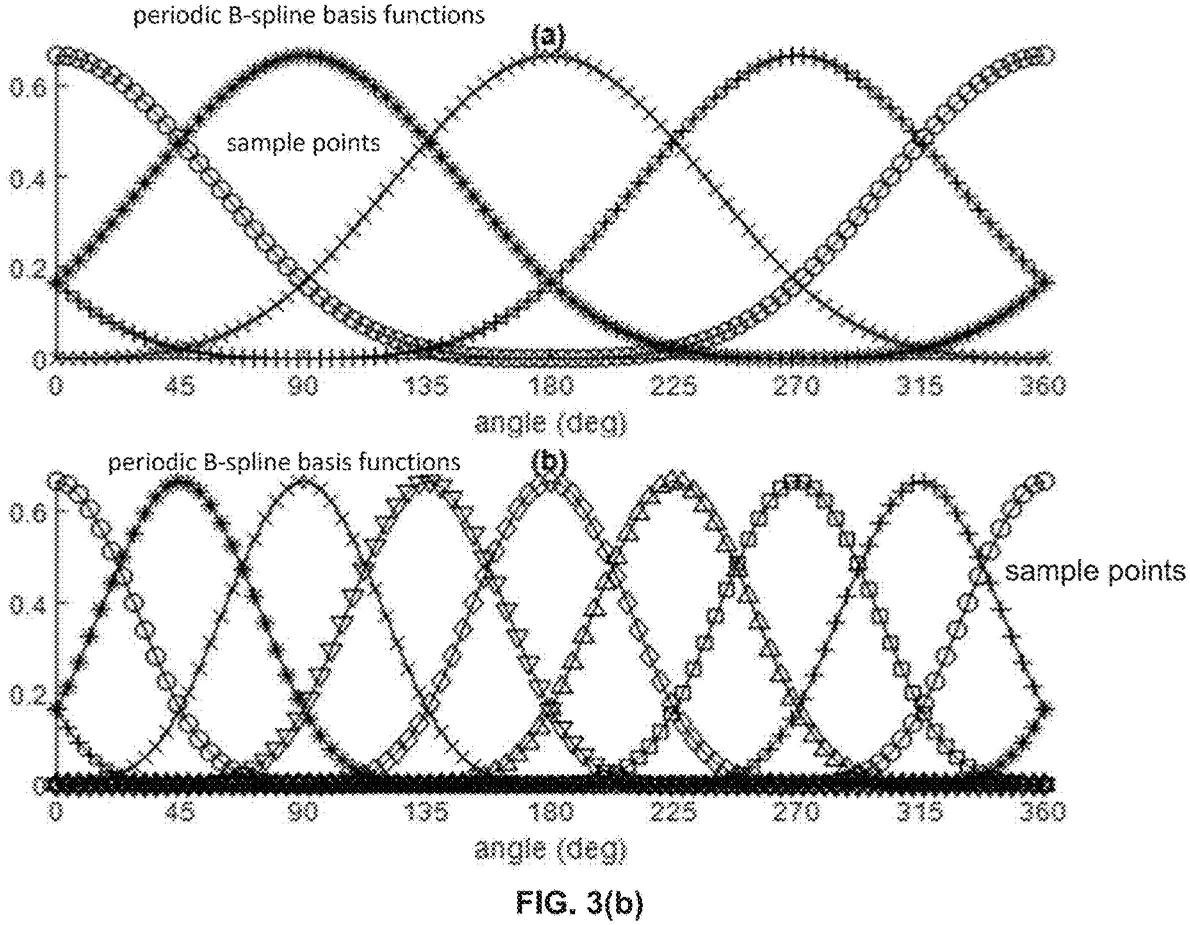
FIGS. 3(*a*) and 3(*b*) show exemplary periodic B-spline basis functions.
Figure 5:
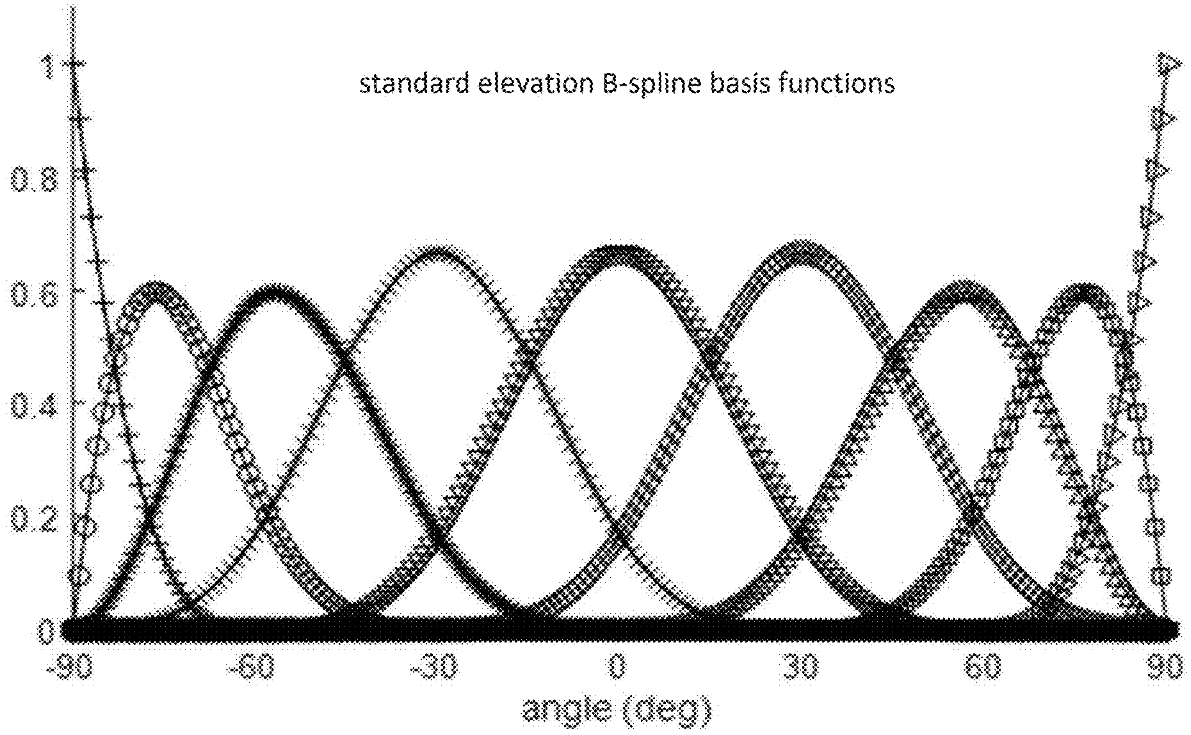
FIG. 5 shows exemplary standard B-spline basis functions.
Figure 6A:
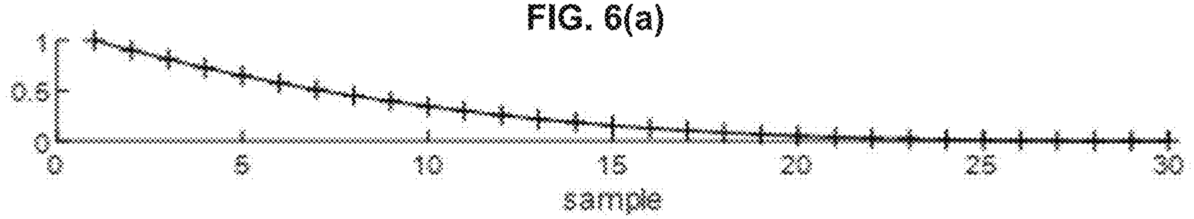
FIGS. 6(*a*)-6(*d*) show exemplary compact representations of the basis functions shown in FIG. 5.
Figure 6B:
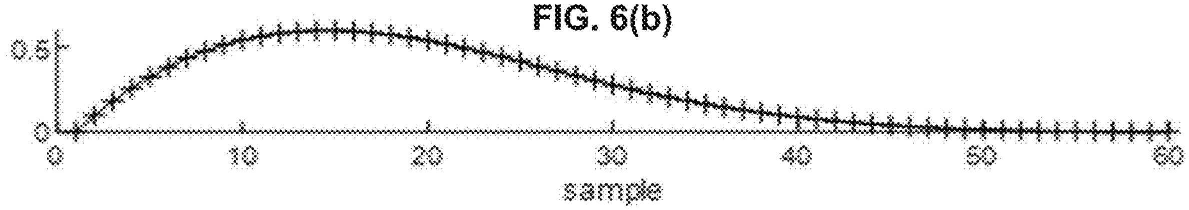
Figure 6C:
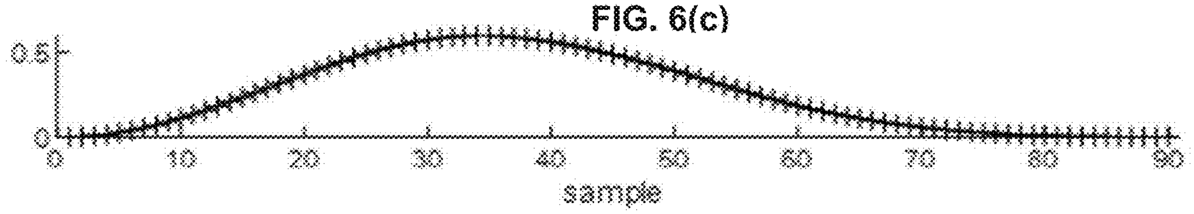
Figure 6D:
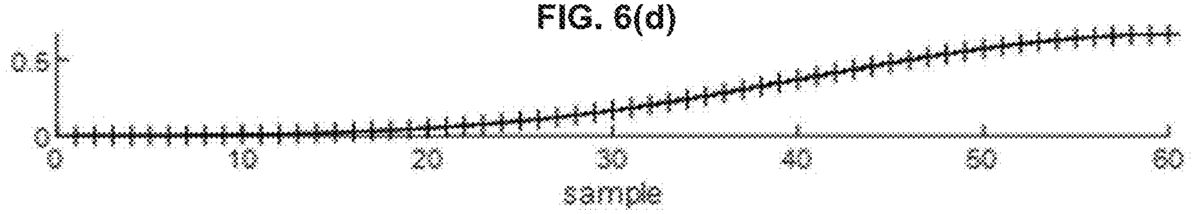

In some embodiments, elevation and azimuth basis functions are designed/selected with certain properties for being efficiently used for HR filter modelling and an efficient structured HR filter generation. Basis functions may be defined over a periodic modelling range (e.g., continuous at the 0/360 degrees azimuth boundary as illustrated in FIGS. 3(*a*) and 3(*b*), or defined over a non-periodic range, for example, [−90, 90] degrees elevation as illustrated in FIG. 5).

Thus, according to some embodiments:

[Property 1] at least one of the basis functions has a first segment which is non-zero valued and another segment which is zero valued, and/or

[Property 2] the non-zero part of said at least one of the basis functions:

a. Is equal to the non-zero part of another basis function; or
b. Has a length of the non-zero part that is a unit fraction of the length of the non-zero part of another basis function with the same shape, i.e.

$$L_2 = \frac{1}{x} L_1$$

where $L_1$ and $L_2$ are the respective lengths and $x=1, 2, 3, \ldots$; and/or c. Is symmetric; or
d. Is a mirror (reverse) of the non-zero part of another basis function.

The more of the basis functions that have the same properties, the more efficient implementation can be made. There may be, however, other factors, such as modeling efficiency and performance, that may also influence the choice of basis functions. For example, depending on the sampling grid of measured HR filter data, a different number of basis functions should be selected to avoid getting underdetermined systems. The basis functions may typically be analytically described (e.g., as splines by polynomials).

In some embodiments, cubic B-spline functions (i.e., $4^{th}$ order or degree 3) are used as basis functions $\Phi_{p,q}(\phi)$ and $\Theta_p(\theta)$ for azimuth and elevation angles respectively.

FIGS. 3(*a*) and 3(*b*) illustrate periodic B-spline basis functions for azimuth angles and FIG. 5 illustrates the corresponding standard B-spline basis functions for elevation angles. Although points are marked with different symbols for better discrimination in the figures, the functions are continuous and may be evaluated at any angle.

2. HR Filter Modeling

The model design parameters (e.g., K, P, $Q_p$, $\Theta_p(\theta)$ and $\Phi_{p,q}(\phi)$) defining the model may be subsequently used for the HR filter modeling where the model parameters $\alpha_{n,k}$ can be estimated with data fitting methods such as minimized least squares methods (e.g., as described in WO 2021/074294).

3. Basis Function Sampling

One aspect of the embodiments of this disclosure is a perceptually motivated sampling of the basis functions $\Phi_{p,q}(\phi)$ and $\Theta_p(\theta)$. As studies have shown, there is Minimum Audible Angle (MAA). Angular changes smaller than MAA are not perceived. Based on this observation, azimuth and elevation sampling intervals $\Delta\phi$ and $\Delta\theta$ may be selected. Although studies suggest $\Delta\Phi=1°$ and $\Delta\Theta=4°$ for transparent quality (i.e., non-audible losses), larger sampling intervals may be selected as a compromise between spatial accuracy and memory and complexity (in terms of computation) requirements for the HR filter evaluation.

In the case where the chosen sample spacing values $\Delta\Phi$, $\Delta\Theta$ are greater than the MAA, interpolation may be used to generate a smoothly varying curve and to avoid step-like changes that may occur due to a very coarsely-spaced set of sample points (this approach reduces memory usages further but increases numerical complexity). The basis function sampling may typically be performed in a pre-processing stage where sampled basis functions to be used for HR filter evaluation are generated and stored in a memory.

3.1. Efficient Representation of Periodic B-spline Basis Functions

FIGS. 3(*a*) and 3(*b*) show two examples of periodic B-spline functions for azimuth, each showing a set of basis functions covering 360 degrees. As shown in the figures, in both examples, all equal symmetric non-zero parts of the basis functions are obtained (coherent of the properties 2a and 2c discussed above), which is always the case as long as there is a regular spacing between knot points.

This means that each of the periodic B-spline basis functions may be efficiently represented by a half of its non-zero shape (due to its symmetrical characteristic). Although the B-spline basis functions may be computed during run time, it is more efficient in terms of computational complexity to store pre-computed shapes (i.e., numerical sampling) of the B-spline basis functions in a memory. On the other hand, it is generally desirable to minimize memory requirements (i.e., the memory capacity required to store the pre-computed shapes). The structure of B-spline basis function(s) according to the embodiments of this disclosure provides a good compromise between the computational complexity and the memory requirements.

As the number of HR filter measurement points is typically the highest at 0° elevation and decreases towards ±90°, fewer basis functions may be utilized towards the pole areas of the sampling sphere.

With a varying number of azimuth B-spline basis functions per elevation, a compact representation for a set of periodic B-spline functions with different knot point intervals $I_K(p)$ may be obtained.

If a knot point interval is $$I_K(p_2) = \frac{I_K(p_1)}{M}$$

for an integer decimation factor M, the non-zero part of the basis function will be coherent with the property 2b discussed in the section 1 of this disclosure above, and a separate shape does not need to be stored, but only the decimation factor M is necessary to recover the shape. In this case, every Mth point of the shape with the largest knot point interval $I_K(p_1)$ corresponds to the samples of the shape with knot point interval $I_K(p_2)=I_K/M$. This is illustrated in FIGS. 4(*a*)-4(*c*).

Figure 4A:
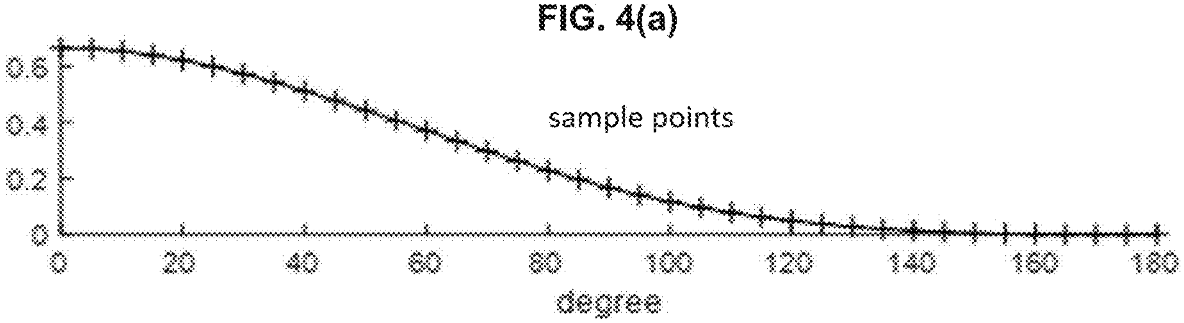
FIGS. 4(*a*)-4(*c*) show exemplary compact representations of the basis functions shown in FIGS. 3(*a*) and 3(*b*).
Figure 4B:
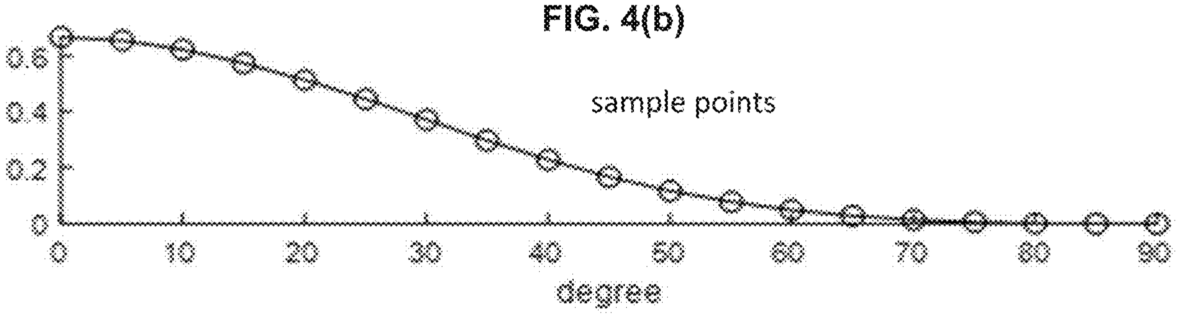
Figure 4C:
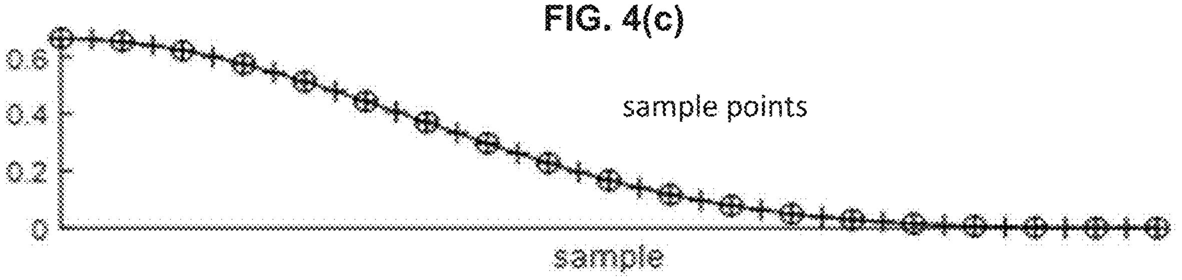

FIGS. 4(*a*)-4(*c*) show compact representation of B-spline basis functions of FIGS. 3(*a*)-3(*b*). As the non-zero parts of the periodic basis functions are symmetric, only half of the shape is needed to represent the full shape. In addition, the B-spline basis functions of FIG. 3(*b*) sample points (circles) are obtained by sub-sampling of the FIG. 3(*a*) sample points (pluses). In FIG. 4(*a*), the pluses represent half of the sample points of the basis functions in FIG. 3(*a*). In FIG. 4(*b*), the circles represent half of the sample points of the basis functions in FIG. 3(*b*). FIG. 4(*c*) shows overlaid shape functions of (a) and (b). While the pluses represent a range of [0, . . . 180] degrees and the circles a range of [0, . . . ,90] degrees, the shape function (b) can be obtained by sub-sampling of the shape function (a).

As explained above, in FIGS. 4(*a*)-4(*c*), the sample points of the shape in FIG. 3(*b*) (circles) can be obtained as every second sample point for the shape of FIG. 3(*a*) (pluses).

3.2 Efficient Representation of Standard B-spline Basis Functions

As for periodic B-spline basis functions, compact representations may be obtained by sampling of standard B-spline basis functions.

FIG. 5 shows standard elevation B-spline basis functions for the case of P=9. Although some of the basis functions shown in FIG. 5 are not symmetric like in the case of periodic B-spline basis functions (e.g., the basis functions shown in FIGS. 3(*a*) and 3(*b*)), it can be seen that the first and last spline functions (from the left side) have mirrored shapes of each other for the non-zero parts (coherent with the property 2d discussed in the section 1 of this disclosure above). Similarly, the second and second-last non-zero spline functions have mirrored shapes of each other, and the third and third-last non-zero spline functions have mirrored shapes of each other. These properties of having mirrored shapes allow memory-efficient storage of the basis functions. Therefore, in some embodiments, a regular interval for knot points may be preferred and used. For model evaluation, a stored shape may be read forwards or backwards depending on the segment being evaluated. The fourth to fourth-last (the fourth, fifth and sixth) B-spline basis functions shown in FIG. 5 hold the same properties as the azimuth B-spline basis functions, i.e., being symmetric and equal for the non-zero parts.

FIGS. 6(*a*)-6(*d*) show a compact representation of the standard B-spline basis functions shown in FIG. 5.

FIG. 6(*a*) shows compact representation of the first and last basis functions of FIG. 5. It corresponds to the mirrored shape of the non-zero part of the last basis function.

FIG. 6(*b*) shows compact representation of the second and second-last basis functions of FIG. 5. It corresponds to the mirrored shape of the non-zero part of the second-last basis function.

FIG. 6(*c*) shows compact representation of the third and third-last basis functions of FIG. 5. It corresponds to the mirrored shape of the non-zero part of the third-last basis function.

FIG. 6(*d*) shows compact representation of the fourth, fifth, and sixth basis functions of FIG. 5. It corresponds to half of the symmetric non-zero parts of the basis functions.

Independently of the total number of B-spline basis functions covering the modeling range (in this case, between −90° and 90°), only four independent non-zero B-spline basis function shapes are needed. Furthermore, one of these non-zero B-spline function shapes (e.g., the function shown in FIG. 6(*d*)) is symmetric as for the periodic spline functions, and therefore only one half of the non-zero part needs to be stored.

3.3 Storing in a Memory

As a result of the basis function sampling, the compact representations of the basis functions (i.e., the basis function shapes) are stored in a memory together with shape metadata. The shape metadata may comprise information representing any one or combination of the followings:

1. The number of basis functions (the number of the azimuth basis functions may be different for different elevations);
2. Starting point of each basis function (within the modeling interval);
3. Shape indices per basis function (identifying which of the stored shapes to use for the basis function);
4. A shape resampling factor M per basis function;
5. A flipping indicator per basis function (indicating whether or not to flip the stored shape for that specific basis function);
6. A basis function structure such as B-splines; and
7. A width of the non-zero part of each basis function.

In some embodiments, if the flipping indicator indicates that the stored shape needs to be flipped, the shape stored in a storage medium may be read from the storage medium backwards such that the flipped shape is provided to the renderer.

Some parameters (e.g., the flipping indicator and the basis function structure) may not need to be stored and transmitted to the renderer, in some embodiments (especially when the model structure is already known to the renderer). For example, if standard cubic B-splines are utilized as in FIG. 5, there is no need to signal that the last 3 basis functions need to be flipped if it is known that both of the basis function sampling and the structured HR filter generation assume that the first 4 shapes (the first three shapes and a half of the fourth shape) are stored in that order. It may further be known that all the basis functions in between the first and last three ones can be constructed by the fourth stored shape. In the case of B-splines, the shape metadata may instead contain information about the knot points. It may also be known that periodic B-spline functions are used for the azimuth basis functions and standard B-spline function are used for the elevation. This is one example where shape metadata parameters may be stored in different storage mediums.

Further, the HR filter model parameters $\alpha_{n,k}$ are stored in the memory together with the basis function shapes and the corresponding shape metadata. In other embodiments, HR filter model parameters, basis function shapes, and/or shape metadata may be stored in different storage mediums.

4. HR Filter Generation

Based on the stored shapes and parameters, a structured HR filter generation may be performed by reading the basis function shapes from the memory, applying them correctly for each basis function based on the shape metadata, and avoiding unnecessary computational complexity (e.g., unnecessary multiplications and summations), thereby resulting in a very efficient evaluation of an HR filter using the HR filter model parameters $\alpha_{n,k}$.

Even though the sampling of the B-spline basis functions may reduce computational complexity (involved in audio rendering) by means of a structured tabularization of the sampled basis functions, HR filter generation (or a model evaluation) may also be optimized to further reduce the computational complexity.

Assuming the structure of azimuth and elevation basis functions according to FIGS. 3 and 5 (i.e., cubic B-spline basis functions), for every direction (θ, ϕ), at most four non-zero B-spline basis functions exist for every azimuth and elevation angle to be evaluated. Thus, for the evaluation of $F_n(\theta, \phi)$ in the equation (8), there will be at most 4·4=16 non-zero components. Accordingly, the filter evaluation in the equation (5) may be reduced to:

$$\hat{h}(\theta, \phi) = \sum_{n=0}^{15} \tilde{F}_n(\theta, \phi)\alpha_n \tag{10}$$

where $\tilde{F}_n(\theta, \phi)$ denotes all non-zero components of $F_n(\theta, \phi)$.

Compared to the full evaluation of N=P·Q (here assuming a constant number of azimuth basis functions, i.e., $Q_p$=Q for all p), the HR filter generation based on the equation (9) provides significant saving in complexity, which becomes larger as more basis functions are used to model the HR filter data.

In most points, there are 4 non-zero basis functions but, at the knot points, less than four basis functions contribute with a non-zero component.

The followings describe methods for providing optimized model evaluation for the generation of HR filters.

4.1 Basis Evaluation for Periodic B-Spline Basis Functions (for Azimuth)

(1) Determine knot segment index $I_n(\phi, p)$:

$$I_n(\phi, p) = \left\lfloor \frac{\phi - I_m(0)}{I_K(p)} \right\rfloor$$

where ϕ is the azimuth angle to be evaluated, $I_m(0)$ the azimuth angle at the first knot point, and $I_K(p)$ is the knot point interval for azimuth B-spline functions at the elevation of index p.

(2) Determine the closest segment sample point:

$$d_0 = \text{round}\left(\frac{\phi - I_m(0)}{I_K(p)} \frac{N_s(p)}{M(p)}\right)$$

where round( ) is a rounding function, $N_s(p)$ is the number of samples per segment $$\left(\text{e.g., } N_s(p) = \left\lceil \frac{I_K(p)}{\Delta\Phi} \right\rceil\right),$$

and M(p) is the decimation factor for the elevation of index p. An example of a suitable rounding function is:

$$\text{round}(x) = \begin{cases} \lfloor x + 0.5 \rfloor & \text{if } x > 0 \\ -\lfloor -x + 0.5 \rfloor & \text{otherwise} \end{cases}$$

where $\lfloor \cdot \rfloor$ denotes a floor function outputting the greatest integer less than or equal to its input.

(3) Determine number of non-zero basis functions $N_b^{azim}$ for azimuth:

```
if(mod(ϕ, I_K(p)) == 0)
    N_b^azim(p) = 3
else
    N_b^azim(p) = 4
end
```

(4) Compute B-spline sample value and shape index:

$$\begin{aligned}
&\text{for } i = 0, \ldots, N_b^{azim}(p) - 1 \\
&\qquad d = d_0 - (i + I_n(\phi, p) - 1)\frac{N_s^{azim}(p)}{M(p)} \\
&\qquad \tilde{\Phi}_p(i) = S_p(|d| \cdot M(p)) \\
&\qquad \tilde{I}_p^{azim}(i) = \text{mod}(I_n + i, Q_p) \\
&\text{end}
\end{aligned}$$

where $S_p$ is the half sampled shape function at elevation p being sub-sampled by a factor M(p) (as explained in section 3.1 above). The index $\tilde{I}^{azim}(i)$ of the stored shape value $\tilde{\Phi}(i)$ is also stored. $Q_p$ is the total number of azimuth B-spline basis functions for the elevation index p. mod(·) is a modulo function used to determine whether the evaluated azimuth angle ϕ lies on a knot point or not.

4.2 Basis Evaluation for Standard B-spline Functions (for Elevation)

(1) Determine knot segment index $I_n(\theta,p)$:

$$I_n(\theta) = \left\lfloor \frac{\theta - I_m(0)}{I_K} \right\rfloor$$

where θ is the elevation angle to be evaluated, $I_m(0)$ the elevation angle at the first knot point, and $I_K$ is the knot point interval for elevation B-spline functions.

(2) Determine the closest segment sample point:

$$d_0 = \mathrm{round}\left(\frac{\theta - I_m(0)}{I_K} N_s\right)$$

where round( ) is a rounding function, $N_s$ is the number of samples per segment $$\left(\text{e.g., } N_s = \left\lceil \frac{I_K}{\Delta\Theta} \right\rceil\right).$$

The rounding function may be the same one as used for Periodic B-spline Basis Functions.

(3) Determine number of non-zero basis functions $N_b^{elev}$

```
if(mod(θ, I_K) == 0)
  N_b^elev = 3
else
  N_b^elev = 4
end
```

At the first and last knot points, $N_b^{elev}=1$ may also be utilized.

Compute B-spline sample value and shape index

```
for i = 0, ... , N_b^elev − 1
  I_S = min (i + I_n(θ), min (3, N_b^elev − 1 − i − I_n(θ)))
  d = d_0 − max(0, i + I_n(θ) − 3) · N_s^elev
    if(i + I_n(θ) > P − 4)
        d = len(S_{I_S}) − 1 − d
    else if(d > len(S_{I_S}) − 1)
        d = 2 · (len(S_{I_S}) − 1) − d
    end
      Θ̃(i) = S_{I_S}(|d|)
      Ĩ^elev(i) = I_n + i
end
```

where $I_S$ is an index representing the relevant sampled shape function $S_{I_S}$ at elevation p.

P is the total number of elevation B-spline basis functions. If the basis function index $(i+I_n)$ is larger than P−4, the shape is read backwards. Otherwise if the shape index is larger than the length of the stored shape, which may happen for the symmetric shape, the shape is also read backwards. The index $\tilde{I}^{elev}(i)$ of the stored shape value $\tilde{\Theta}(i)$ is also stored. len(·) determines the length of the input vector, min(·,·), max(·,·) determines the minimum and the maximum of the input arguments, respectively.

4.3 HR Filter Evaluation

Once the azimuth B-spline basis functions and the elevation B-spline basis functions are evaluated, $F_n(\theta, \phi)$ may be determined by:

$$\tilde{F}_{n(p,q)}(\theta,\phi)=\Theta_p(\theta)\Phi_{p,q}(\phi)$$

with $n(p,q)=\Sigma_{i=0}^{\tilde{I}^{elev}(p)-1} N_b^{azim}(i)+\tilde{I}_p^{azim}(q)$ if p>0, otherwise $n(p,q)=\tilde{I}_0^{azim}(q)$, for p=0, . . . , $N_b^{elev}-1$ and q=0, . . . , $N_b^{azim}(p)-1$.

Then each HR filter coefficient $\hat{h}_k(\theta, \phi)$ may be determined as:

$$\hat{h}_k(\theta, \phi) = \sum_{n=0}^{\Sigma_{i=0}^{p-1} N_b^{azim}(i)-1} \tilde{F}_n(\theta, \phi)\alpha_{n(p,q),k}$$

with the HR filter tap index k=0, . . . , K−1.

5. Binaural Rendering

In some embodiments, the above described method may be used for the zero-time delay part of the HR filters, i.e. excluding onset time delays of each filter or delay differences between the left and right HR filter due to an inter-aural time difference. The above described method may in an equivalent manner be utilized to evaluate the inter-aural time difference being modeled in a similar manner by means of B-spline basis functions (e.g., as described in WO 2021/074294). In such case, a single ITD is determined, i.e., K=1 in the contrary to the HR filters where the number of filter taps K>>1. The resulting inter-aural time difference may then be taken into account either by modification of the generated HR filters ($\hat{h}^L(\theta, \phi)$ and/or $\hat{h}^R(\theta, \phi)$) or by taking the time difference into account by applying an offset during the filtering step.

HR filters $\hat{h}^L(\theta, \phi)$ and $\hat{h}^R(\theta, \phi)$ are generated for the left and right sides respectively using separate weight matrices $\alpha_n^L$ and $\alpha_n^R$ but using the identical basis functions, i.e., the identical $\tilde{F}_n(\theta, \phi)$. Thus, $\tilde{F}_n(\theta, \phi)$ is only evaluated once per updated direction $(\theta, \phi)$.

Binaural audio signals for a mono source u(n) may then be obtained (for example, by using well-known techniques) by filtering an audio source signal with the left and right HR filters respectively. The filtering may be done in the time domain using regular convolution techniques or in more optimized manner, for example, in the Discrete Fourier Transform (DFT) domain with overlap-add techniques, when the filters are long. K=96 taps corresponds to 2 ms filters for 48 kHz sample rate.

Embodiments of this disclosure are based on two main categories of optimization—pre-computed sampled basis functions and a structured HR filter evaluation. In some embodiments, sampled basis functions are computed and stored in a memory in a pre-processing stage. Also the structured HR filter evaluation may be executed in runtime within a renderer or may be pre-computed and stored as a set of sampled HR filters. As the memory needed to store HR filter set sampled with fine azimuth and elevation resolution is significant, in some embodiments, the HR filters are evaluated during runtime.

Figure 7:
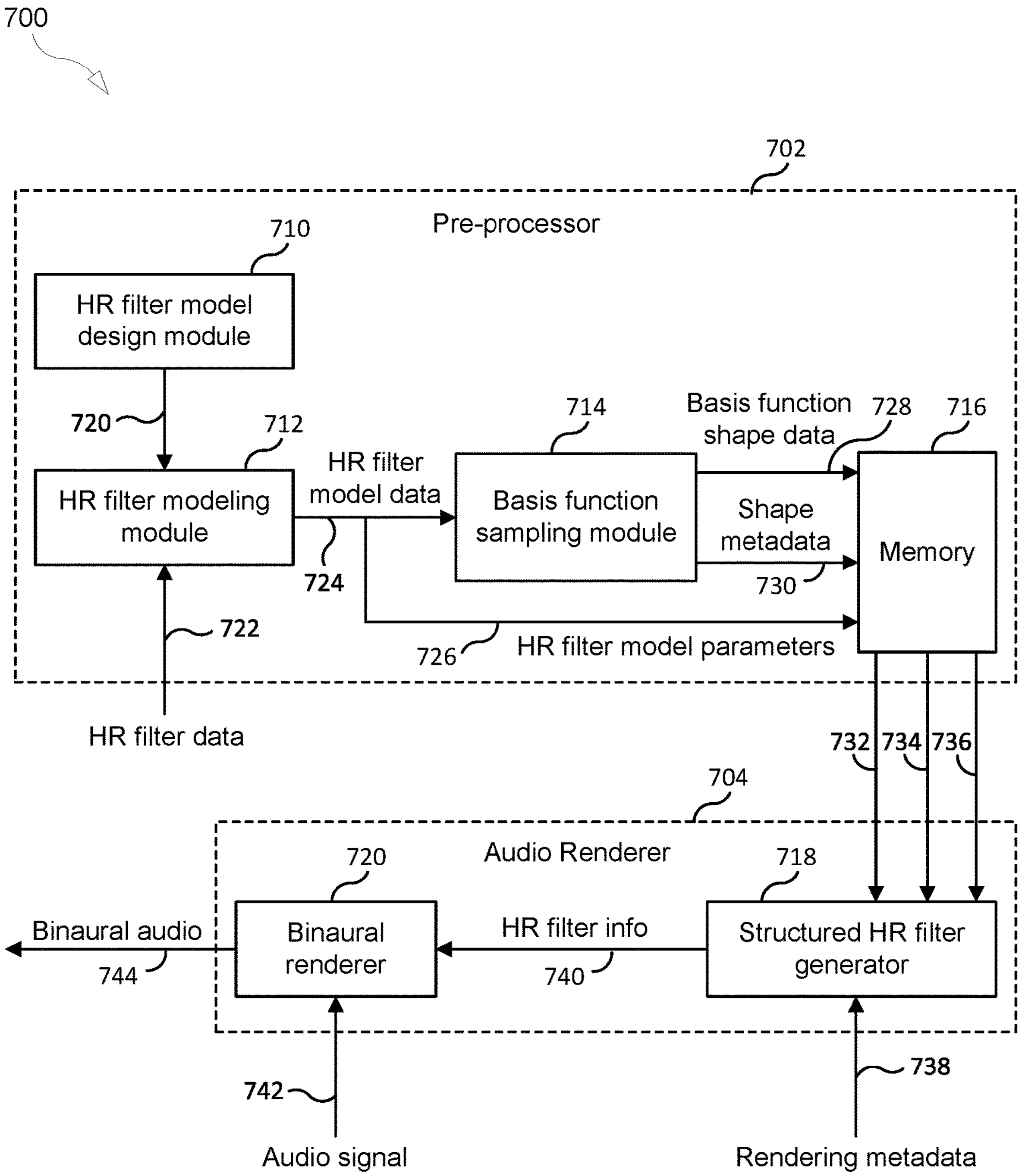
FIG. 7 is a system according to some embodiments.

FIG. 7 shows an exemplary system 700 according to some embodiments. The system 700 comprises a pre-processor 702 and an audio renderer 704. The pre-processor 702 and the audio renderer 704 may be included in the same entity or in different entities. Also, different modules (e.g., 710, 712, 714, and/or 716) included in the pre-processor 702 may be included in the same entity or different entities, and different modules (718 and/or 720) included in the audio renderer 704 may be included in the same entity or different entities.

In one example, the pre-processor 702 is included in any one of an audio encoder, a network entity (e.g., in a cloud), and an audio decoder (i.e., the audio renderer 704). The audio renderer 704 may be included in any electronic device capable of generating audio signals (e.g., a desktop, a laptop, a tablet, a mobile phone, a head-mounted display, an XR simulation system, etc.).

The pre-processor 702 includes HR filter model design module 710, HR filter modeling module 712, basis function sampling module 714, and a memory 716. The HR filter model design module 710 is configured to output design data 720 toward the HR filter modeling module 712. The HR filter modeling module 712 may receive HR filter data 722 and obtain an HR filter model based on the received design data 720 and the received HR filter data 722. In some embodiments, the HR filter model is designed according to the properties (1) and (2)(a)-(2)(d) discussed above.

Obtaining the HR filter model may comprise selecting a certain basis function structure—i.e., selecting a set of basis functions for azimuth angles ("azimuth basis functions") and/or a set of basis functions for elevation angles ("elevation basis functions"). Azimuth basis functions may be selected to be periodic over a modeling range (e.g., between 0° and 360°). The modeling range may be divided into $N^{seg}$ equally sized segments bounded by knot points. The basis functions may be selected such that at least one basis function is zero-valued in one or more segments. Also the basis functions may be selected such that at most $N_b<\{P, Q_p\}$ basis functions are non-zero (i.e., at most $N_b^{elev}$ (which is lower than P) elevation basis functions are non-zero and/or at most $N_b^{azim}$ (which is lower than $Q_p$) azimuth basis functions are non-zero) within a segment i where P is the total number of elevation basis functions and $Q_p$ is the total number of azimuth basis functions for an elevation p. Furthermore, the basis functions (the azimuth basis functions and/or the elevation basis functions) may be selected such that some basis functions' non-zero parts are symmetric, mirrored, or sub-sampled versions of other basis functions' non-zero parts, so as to make use of the optimization technique described in this disclosure.

After obtaining the HR filter model, the HR filter modeling module 712 outputs HR filter model data 724 to the basis function sampling module 714. The HR filter model data 724 may indicate the obtained HR filter model (i.e., the selected basis function structure). Based on the received HR filter model data 724, the basis function sampling module 714 may sample the basis functions at intervals ΔΦ (for the azimuth basis functions) and AO (for the elevation basis functions) and obtain compact representations (of non-zero parts) of the azimuth basis functions and/or the elevation basis functions. The compact representations of the basis functions can be obtained because not all parts of the basis functions are needed to represent the basis functions. For example, for symmetric non-zero parts of a basis function, only half of the shape of the basis function is needed to represent the shape. For mirrored or flipped non-zero parts of a basis function, only one of the mirrored parts is needed to represent the shape of the basis function. For sub-sampled non-zero parts of a basis function, only the largest shape is needed to represent the shape of the basis function.

After obtaining the compact representations of the basis functions, the basis function sampling module 714 may store basis function shape data 728 and shape metadata 730 in the memory 716. The basis function shape data 728 may indicate the shapes of the compact representations of the basis functions. The shape metadata 730 may include information about the structure of the compact representations in relation to the HR filter model basis functions. For example, the shape metadata 730 may include information about shape, orientation (e.g., flipped or not), and sub-sampling factor M in relation to the model basis functions. Detailed information about the shape metadata 730 is provided above in section 3.3 of this disclosure.

In addition to the basis function shape data 728 and the shape metadata 730, the memory 716 may also store additional HR filter model parameters 726 (e.g., α parameters).

The audio renderer 704 includes a structured HR filter generator 718 and a binaural renderer 720. The structured HR filter generator 718 reads from the memory 716 basis function shape data 732, shape metadata 734, and additional HR filter model parameter(s) 736, and receives rendering metadata 738. The basis function shape data 732 may be same as or related to the basis function shape data 728. Similarly, the shape metadata 734 and the model parameter(s) 736 may be same as or related to the shape metadata 730 and the model parameter(s) 726 respectively.

The structured HR filter generator 718 may generate HR filter information 740 indicating HR filters, based on (i) the basis function shape data 732, (ii) the shape metadata 734, (iii) the additional HR filter model parameter(s) 736, and (iv) the rendering metadata 738. The rendering metadata 738 may define a direction (θ, ϕ) to be evaluated.

Figure 8:
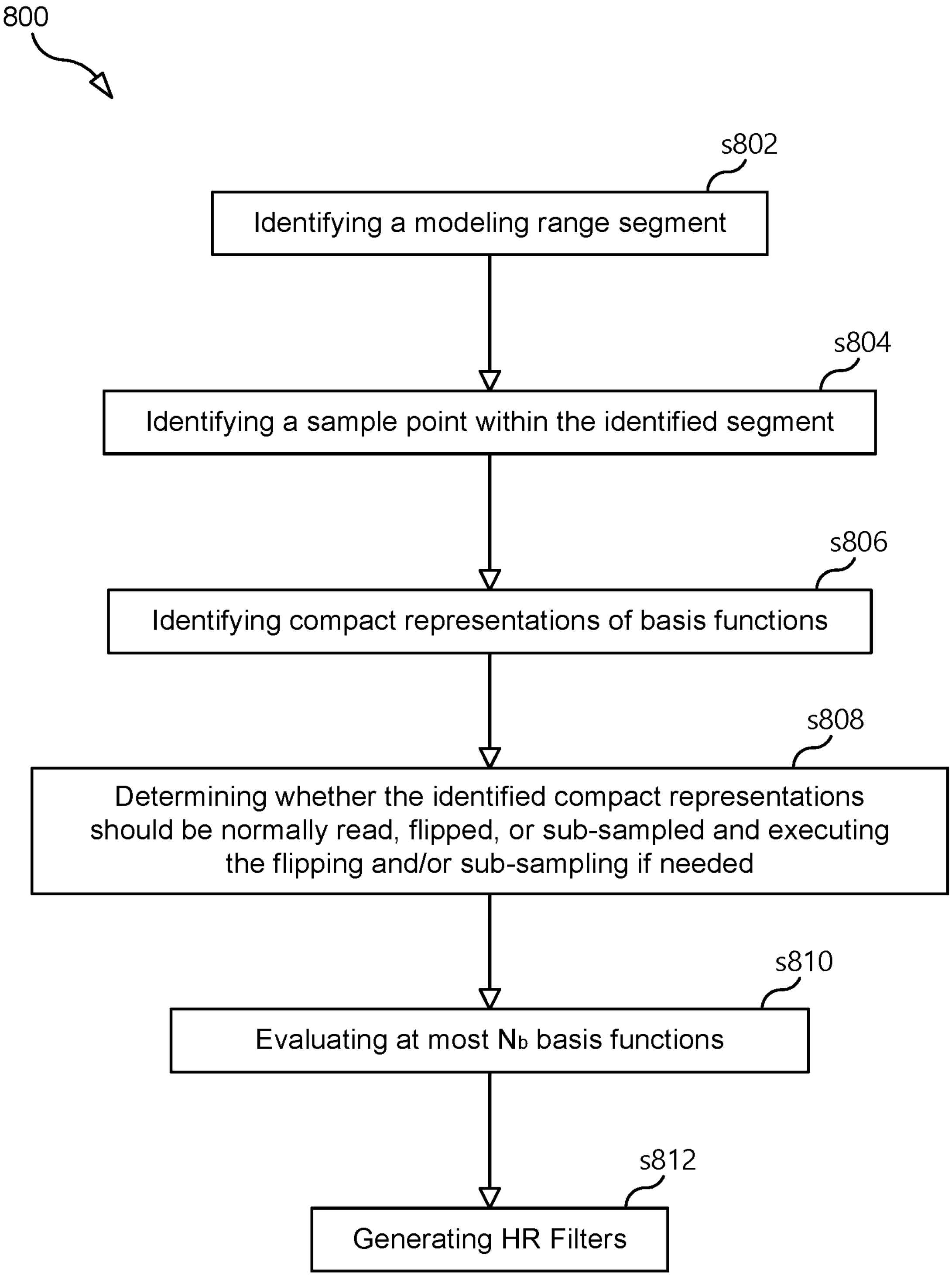
FIG. 8 is a process for generating a HR filter according to some embodiments.

FIG. 8 shows an exemplary process 800 according to some embodiments. The process 800 may be performed by the structured HR filter generator 718 included in the audio renderer 704.

The process 800 may begin with step s802. In the step s802, the structured HR filter generator 718 identifies a segment in a modeling range based on the received rendering metadata 738. For example, the rendering metadata 738 defines a particular direction (θ, ϕ) to be evaluated, and the generator 718 identifies the segment to which the defined direction belongs.

After performing the step s802, in step s804, the structured HR filter generator 718 identifies a sample point within the segment identified in the step s802.

After performing the step s804, in step s806, the generator 718 identifies the compact representations of the basis functions (i.e., the azimuth basis functions and the elevation basis functions) based on the basis function shape data 732.

After performing the step s806, in step s808, the generator 718 determines, based on the shape metadata 734, whether the identified compact representations should be normally read, flipped, or sub-sampled according to a sub-sampling factor M and performs the flipping and/or sub-sampling if needed.

After performing the step s808, in step s810, the generator 718 evaluates at most $N_b$ basis functions. Such evaluation includes obtaining sample values within each of the compact representations of at most $N_b$ non-zero basis functions for the identified segment. Detailed explanation as to how the basis functions are evaluated is provided in sections 4.1 and 4.2 above.

After performing the step s810, in step s812, based on (i) the obtained azimuth basis function values, (ii) the obtained elevation basis function values, and (iii) the additional model parameter(s) 736 (e.g., the parameters α), the structured HR filter generator 718 generates an HR filter. The HR filter may be generated as the sum of the multiplied azimuth and elevation basis function values weighted by the corresponding model weight parameter (α) for each filter tap k separately. A detailed explanation as to how the HR filter is generated is provided in section 4.3 above.

The HR filters (for the left and right sides) generated by the structured HR filter generator 718 are subsequently provided to the binaural renderer 720.

Using the HR filters generated by the generator 718, the binaural renderer 720 may binauralize audio signal 742—i.e., generating two audio output signals 744 (for the left and right sides).

Figure 9:
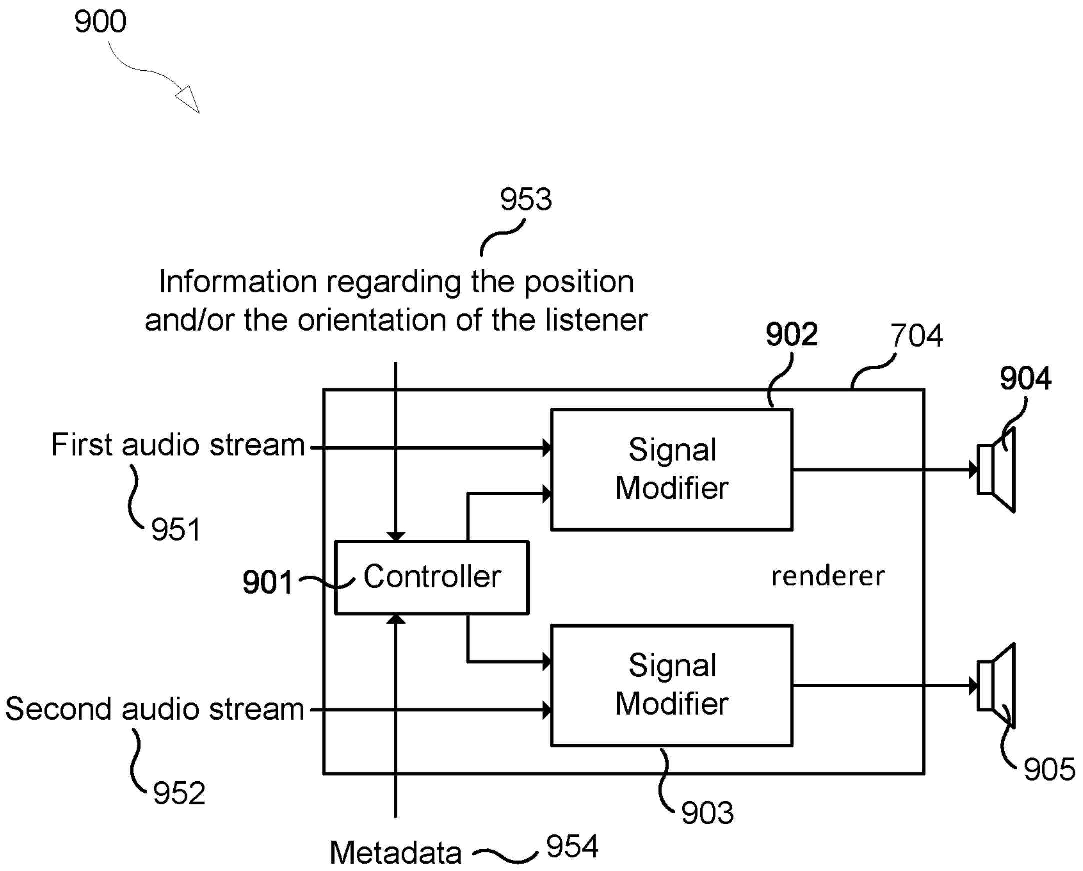
FIG. 9 is a system according some embodiments.

FIG. 9 shows an example system 900 for producing a sound for a XR scene. System 900 includes a controller 901, a signal modifier 902 for first audio stream 951, a signal modifier 903 for second audio stream 952, a speaker 904 for first audio stream 951, and a speaker 905 for second audio stream 952. While two audio streams, two modifiers, and two speakers are shown in FIG. 9, this is for illustration purpose only and does not limit the embodiments of the present disclosure in any way. For example, in some embodiments, there may be N number of audio streams corresponding to N audio objects to be rendered, which includes a single mono signal corresponding to a single audio object. Furthermore, even though FIG. 9 shows that system 900 receives and modifies first audio stream 951 and second audio stream 952 separately, system 900 may receive a single audio stream representing multiple audio streams. The first audio stream 951 and the second audio stream 952 may be the same or different. In case the first audio stream 951 and the second audio stream 952 are the same, a single audio stream may be split into two audio streams that are identical to the single audio stream, thereby generating the first and second audio streams 951 and 952.

Controller 901 may be configured to receive one or more parameters and to trigger modifiers 902 and 903 to perform modifications on first and second audio streams 951 and 952 based on the received parameters (e.g., increasing or decreasing the volume level in accordance with the a gain function). The received parameters are (1) information 953 regarding the position the listener (e.g., a distance and a direction to an audio source) and (2) metadata 954 regarding the audio source. The information 953 may include the same information as the rendering metadata 738 shown in FIG. 7. Similarly, the metadata 954 may include the same information as the shape metadata 734 shown in FIG. 7.

Figure 10A:
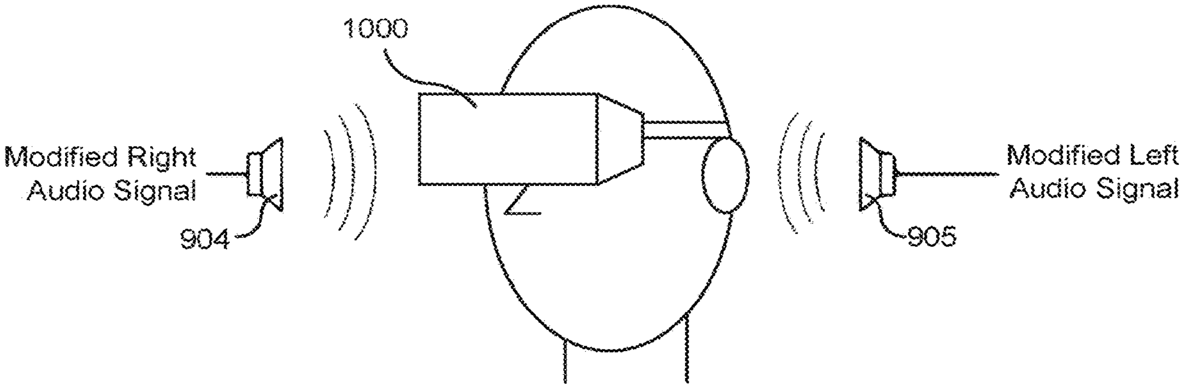
FIGS. 10A and 10B show an apparatus according to some embodiments.
Figure 10B:
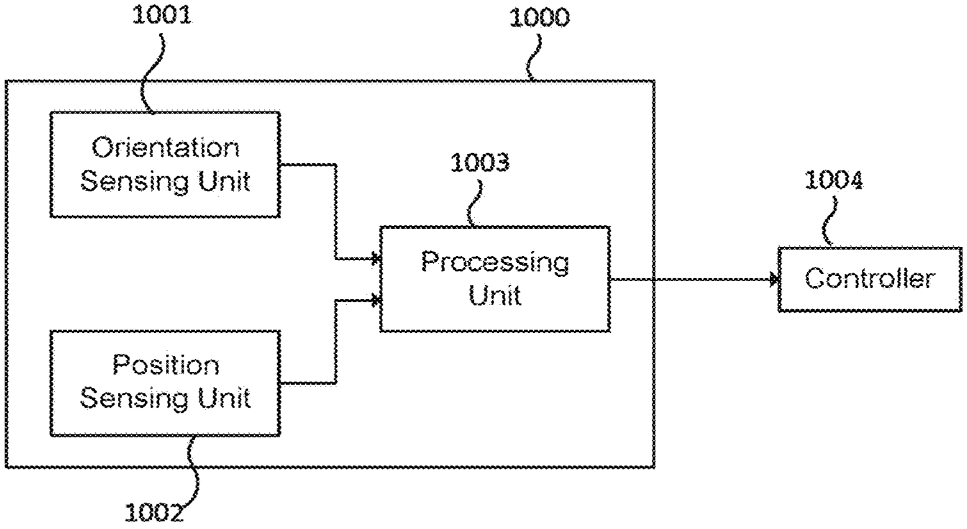

In some embodiments of this disclosure, information 953 may be provided from one or more sensors included in an XR system 1000 illustrated in FIG. 10A. As shown in FIG. 10A, XR system 1000 is configured to be worn by a user. As shown in FIG. 10B, XR system 1000 may comprise an orientation sensing unit 1001, a position sensing unit 1002, and a processing unit 1003 coupled to controller 1004 of system 1000. Orientation sensing unit 1001 is configured to detect a change in the orientation of the listener and provides information regarding the detected change to processing unit 1003. In some embodiments, processing unit 1003 determines the absolute orientation (in relation to some coordinate system) given the detected change in orientation detected by orientation sensing unit 1001. There could also be different systems for determination of orientation and position, e.g., the HTC Vive system using lighthouse trackers (lidar). In one embodiment, orientation sensing unit 1001 may determine the absolute orientation (in relation to some coordinate system) given the detected change in orientation. In this case the processing unit 1003 may simply multiplex the absolute orientation data from orientation sensing unit 1001 and the absolute positional data from position sensing unit 1002. In some embodiments, orientation sensing unit 1001 may comprise one or more accelerometers and/or one or more gyroscopes. The type of the XR system 1000 and/or the components of the XR system 1000 shown in FIGS. 10A and 10B are provided for illustration purpose only and do not limit the embodiments of this disclosure in any way. For example, although the XR system 1000 is illustrated including a head-mounted display covering the eyes of the user, the system may be not be equipped with such display, e.g., for audio-only implementations.

Figure 11:
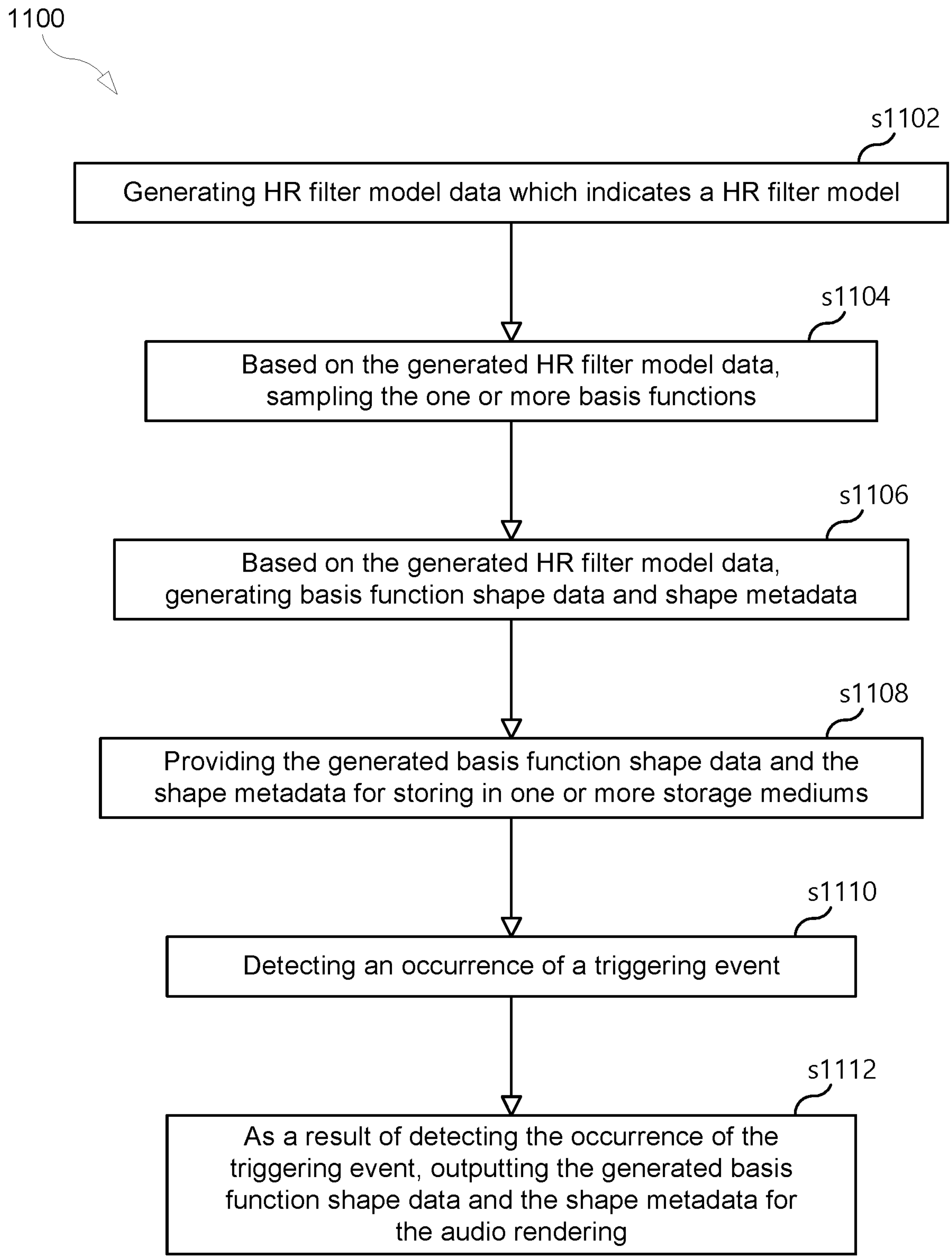
FIGS. 11 and 12 are processes according to some embodiments.

FIG. 11 is a flow chart illustrating a process 1100 for generating an HR filter for audio rendering. The process 1100 may begin with step s1102.

Step s1102 comprises generating HR filter model data which indicates an HR filter model. Generating the HR filter model data may comprise selecting at least one set of one or more basis functions.

Step s1104 comprises based on the generated HR filter model data, sampling (s1104) said one or more basis functions.

Step s1106 comprises based on the generated HR filter model data, generating first basis function shape data and shape metadata. The first basis function shape data identifies one or more compact representations of said one or more basis functions, and the shape metadata includes information about the structure of said one or more compact representations in relation to said one or more basis functions.

Step s1108 comprises providing the generated first basis function shape data and the shape metadata for storing in one or more storage mediums.

Step s1110 comprises detecting an occurrence of a triggering event.

Step s1112 comprises as a result of detecting the occurrence of the triggering event, outputting second basis function shape data and the shape metadata for the audio rendering.

Such triggering event may indicate that a head-related (HR) filter for audio rendering is to be generated, which may be induced from the audio renderer when a head-related (HR) filter is requested, e.g., for rendering a frame of audio or for preparing the rendering by generation of a head-related (HR) filter stored in memory for subsequent use. In some embodiments, the triggering event is just a decision to retrieve basis function shape data and/or shape metadata from one or more storage mediums.

In some embodiments, said at least one set of one or more basis functions is selected such that any one or combination of following conditions is satisfied:

(i) said at least one set of one or more basis functions is periodic over a modeling range;

(ii) at least one basis function included in said at least one set is zero-valued in one or more segments included in the modeling range;

(iii) at most N number of basis functions included in said at least one set are non-zero in a segment included in the modeling range, wherein N is a positive integer and less than the total number of basis functions included in said at least one set; and (iv) at least one non-zero part of said one or more basis functions is any one or combination of (1) symmetric or mirrored with respect to another non-zero part of said one or more basis functions or (2) a sub-sampled version of another non-zero part of said one or more basis functions.

In some embodiments, the compact representations of said one or more basis functions indicates shapes of non-zero parts of said one or more basis functions, and the shapes of said non-zero parts of said one or more basis functions are symmetric or mirrored with respect to shapes of another non-zero parts of said one or more basis functions.

In some embodiments, the shape metadata comprises any one or combination of the following information:

(i) the number of basis functions;

(ii) starting point of each basis function;

(iii) one or more shape indices each identifying a particular shape to use for audio rendering;
(iv) a shape resampling factor for one or more basis functions;
(v) a flipping indicator for one or more basis functions, wherein the flipping indictor indicates whether to obtain a flipped version of said one or more compact representations of said one or more basis functions stored in said one or more storage mediums;
(vi) a basis function structure; and
(vii) a width of non-zero part of each basis function.

In some embodiments, the method further comprises providing an additional HR filter model parameter for storing in said one or more storage mediums.

In some embodiments, the method is performed by a pre-processor prior to an occurrence of an event triggering the audio rendering.

In some embodiments, the method is performed by a pre-processor included in a network entity that is separate and distinct from an audio renderer.

In some embodiments, the second basis function shape data and the shape metadata are used for generating the HR filter.

In some embodiments, the first basis function shape data and the second basis function shape data are the same.

In some embodiments, the second basis function shape data identifies a converted version of said one or more compact representations of said one or more basis functions, and the converted version of said one or more compact representations of said one or more basis functions is a symmetric or mirrored version and/or a sub-sampled version of said one or more compact representations of said one or more basis functions.

Figure 12:
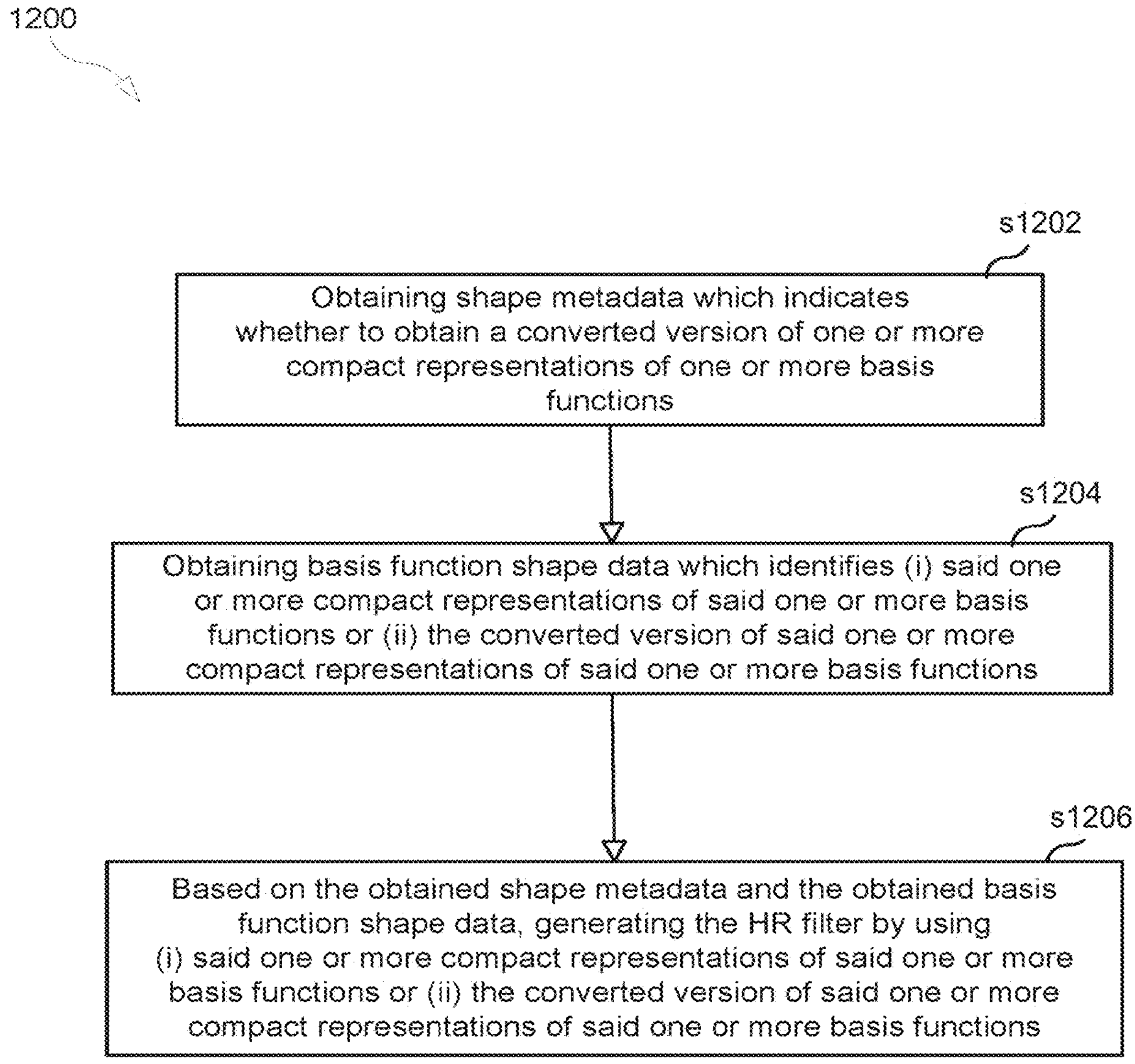

FIG. 12 is a flow chart illustrating a process 1200 for generating an HR filter for audio rendering. The process 1200 may begin with step s1202.

Step s1202 comprises obtaining shape metadata which indicates whether to obtain a converted version of one or more compact representations of one or more basis functions.

Step s1204 comprises obtaining basis function shape data which identifies (i) said one or more compact representations of said one or more basis functions or (ii) the converted version of said one or more compact representations of said one or more basis functions.

Step s1206 comprises based on the obtained shape metadata and the obtained basis function shape data, generating the HR filter by using (i) said one or more compact representations of said one or more basis functions or (ii) the converted version of said one or more compact representations of said one or more basis functions.

In some embodiments, the method further comprises after obtaining the shape metadata which indicates how to obtain the converted version of said one or more compact representations of said one or more basis functions, obtaining from a storage medium data corresponding to said one or more compact representations of said one or more basis function. The data is obtained in a predefined manner such that the converted version of said one or more compact representations of the said one or more basis functions is obtained.

In some embodiments, the method comprises receiving data which identifies said one or more compact representations of said one or more basis functions and providing the received data for storing in another storage medium. Obtaining basis function shape data which identifies the converted version of said one or more compact representations of said one or more basis functions comprises reading from said another storage medium the stored received data in a predefined manner.

In some embodiments, the converted version of said one or more compact representations of said one or more basis functions is a symmetric or mirrored version and/or a sub-sampled version of said one or more compact representations of said one or more basis functions.

In some embodiments, obtaining the data in the predefined manner includes (i) obtaining the data in a predefined sequence and/or (ii) obtaining the data partially.

In some embodiments, the converted version of the compact representations of said one or more basis functions is a symmetric or mirrored version and/or a sub-sampled version of the compact representations of said one or more basis functions.

In some embodiments, the method further comprises obtaining rendering metadata which indicates a particular direction or location to be evaluated and based on the obtained rendering metadata, identifying a sample point related to the particular direction or location to be evaluated.

In some embodiments, said one or more compact representations of said one or more basis functions indicate shapes of non-zero parts of said one or more basis functions, and the shapes of said non-zero parts of said one or more basis functions are symmetric or mirrored with respect to shapes of another non-zero parts of said one or more basis functions.

In some embodiments, the shape metadata comprises any one or combination of the following information: (i) the number of basis functions; (ii) starting point of each basis function; (iii) one or more shape indices each identifying a particular shape to use for HR filter generation; (iv) a shape resampling factor for one or more basis functions; (v) a flipping indicator for one or more basis functions, wherein the flipping indictor indicates whether to obtain a flipped version of said one or more compact representations of said one or more basis functions stored in the storage medium; (vi) a basis function structure; and (vii) a width of the non-zero part of each basis function.

In some embodiments, the method further comprises obtaining an audio signal; and using the generated HR filter, filtering the obtained audio signal to generate a left audio signal for a left side and a right audio signal for a right side. The left and right audio signals are associated with the particular direction and/or location indicated by the rendering metadata.

Figure 13:
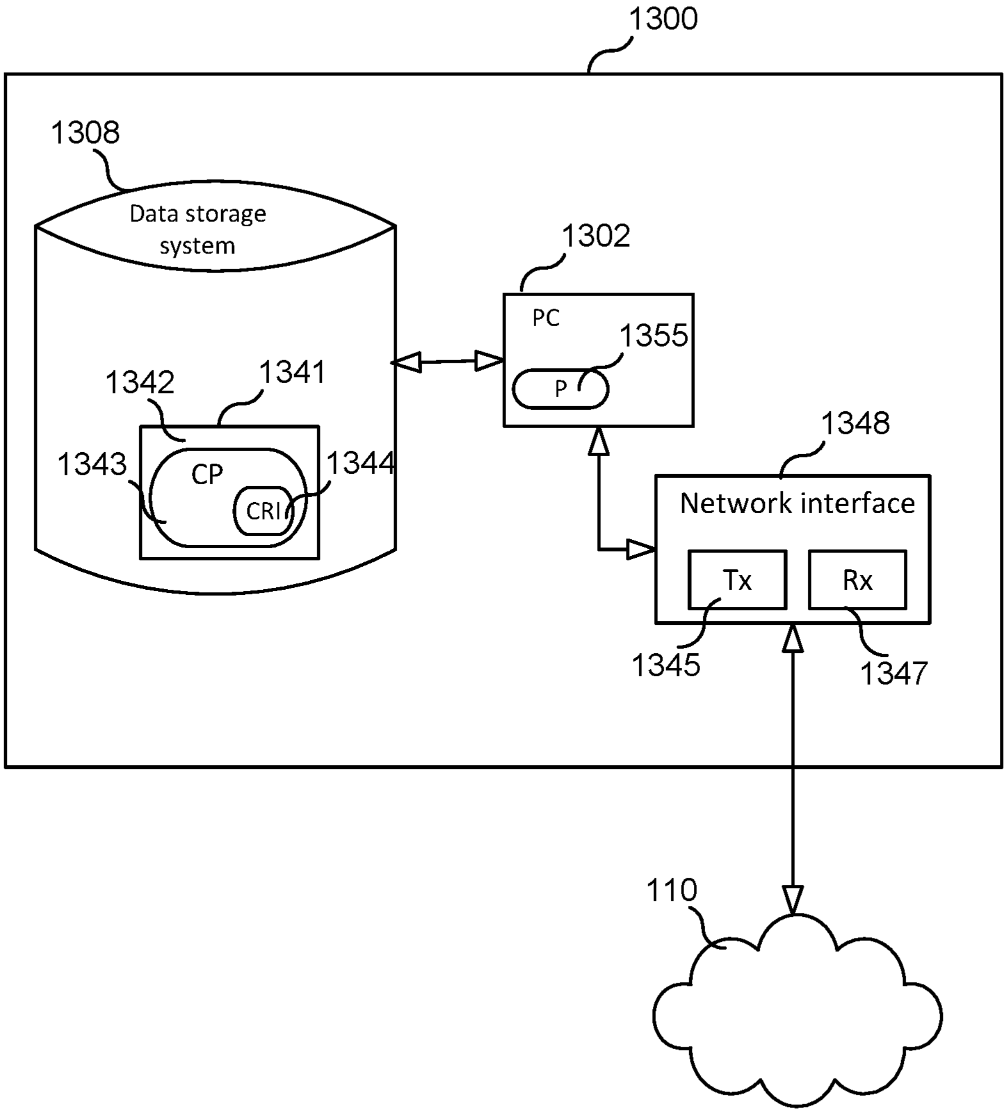
FIG. 13 is an apparatus according to some embodiments.
Figure 14:
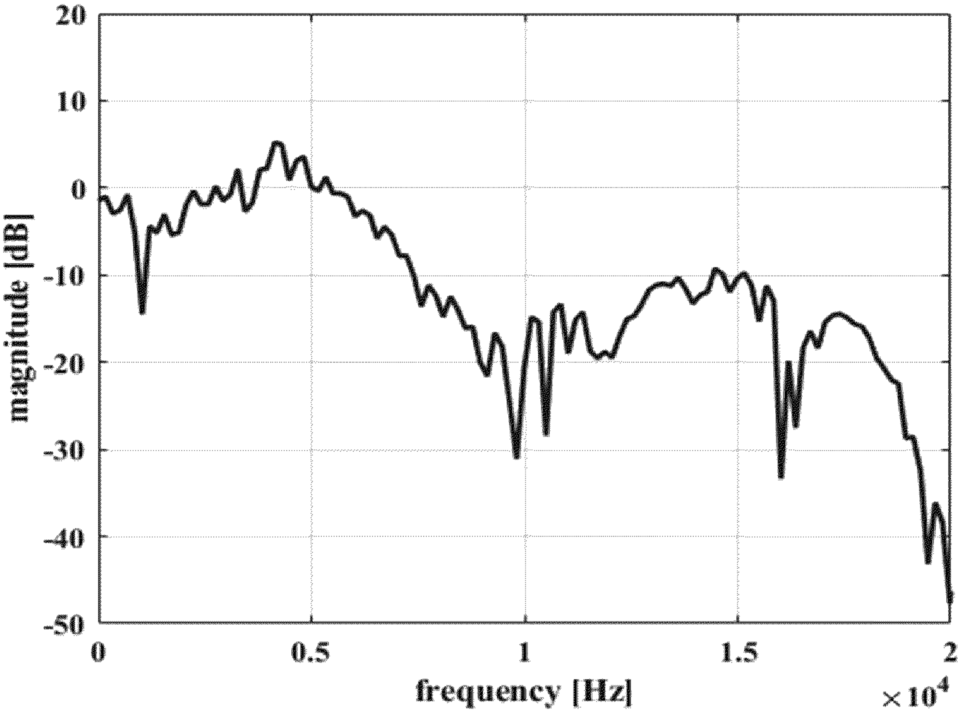
FIG. 14 shows ITD and HR filters of the sound wave shown in FIG. 2.
Figure 14:
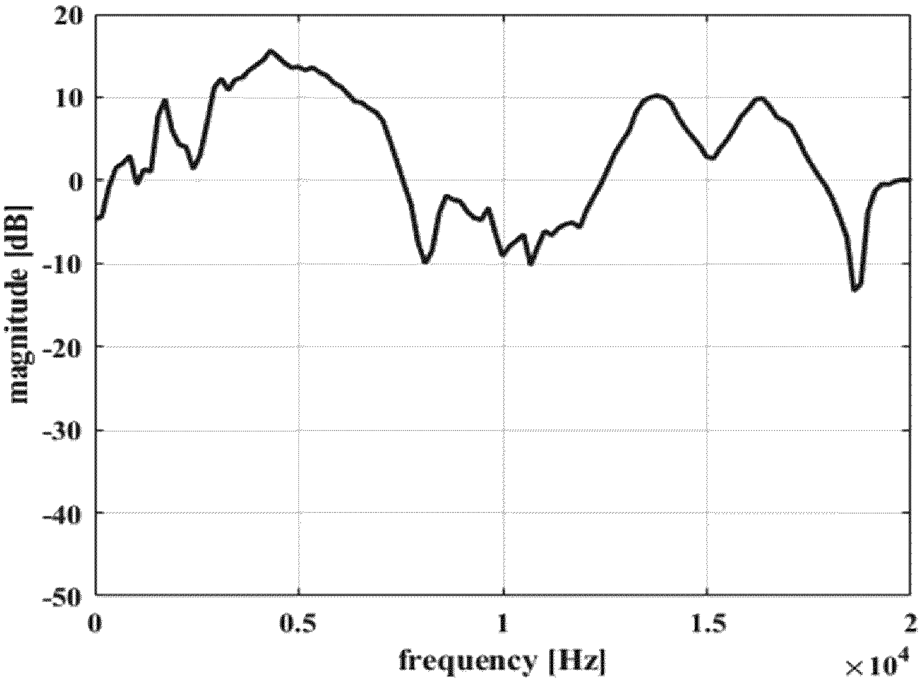

FIG. 13 is a block diagram of an apparatus 1300, according to some embodiments, for implementing the pre-processor 702 or the audio renderer 704 shown in FIG. 7. As shown in FIG. 13, apparatus 1300 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1300 may be a distributed computing apparatus); at least one network interface 1348, each network interface 1348 comprises a transmitter (Tx) 1345 and a receiver (Rx) 1347 for enabling apparatus 1300 to transmit data to and receive data from other nodes connected to a network 110 (e.g., an Internet Protocol (IP) network) to which network interface 1348 is connected (directly or indirectly) (e.g., network interface 1348 may be wirelessly connected to the network 110, in which case network interface 1348 is connected to an antenna arrangement); and one or more storage units (a.k.a., “data storage system”) 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes apparatus 1300 to perform steps described herein (e.g., steps described herein with reference to the flow charts). In other embodiments, apparatus 1300 may be configured to perform steps described herein without the need for code. That is, for example, PC 1302 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes and message flows described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

6. Abbreviation

| | |
|---|---|
| $\alpha$ | The matrix of scalar weighting values used in HR filter model evaluation. N rows by K columns. |
| $\alpha_{n,k}$ | A single scalar entry in the matrix $\alpha$ indexed by row n and column k. |
| $\alpha_n$ | One row of the matrix $\alpha$. A vector of size 1 by K |
| $\theta$ | Elevation angle |
| $\phi$ | Azimuth angle |
| AR | Augmented Reality |
| D/R ratio | Direct-to-Reverberant ratio |
| DOA | Direction of Arrival |
| FD | Frequency Domain |
| FIR | Finite Impulse Response |
| HR Filter | Head-Related Filter |
| HRIR | Head-Related Impulse Response |
| HRTF | Head-Related Transfer Function |
| ILD | Interaural Level Difference |
| IR | Impulse Response |
| ITD | Interaural Time Difference |
| MAA | Minimum Audible Angle |
| MR | Mixed Reality |
| SAOC | Spatial Audio Object Coding |
| TD | Time Domain |
| VR | Virtual Reality |
| XR | Extended Reality |

The invention claimed is:

1. A method for generating a head-related (HR) filter for audio rendering, the method comprising:

obtaining shape metadata which indicates whether to obtain a converted version of one or more compact representations of one or more HR filter model basis functions, said compact representations indicating shapes of non-zero parts of said one or more HR filter model basis functions and the converted version of the one or more compact representations being a flipped or mirrored version and/or a sub-sampled version of said compact representations;

obtaining HR filter model basis function shape data which identifies (i) said one or more compact representations of said one or more HR filter model basis functions or (ii) the converted version of said one or more compact representations of said one or more HR filter model basis functions;

based on the obtained shape metadata and the obtained HR filter model basis function shape data, generating the HR filter as a vector which is a weighted sum of one or more HR filter model basis vectors, by an HR filter generator using (i) said one or more compact representations of said one or more HR filter model basis functions and/or (ii) the converted version of said one or more compact representations of said one or more HR filter model basis functions;

obtaining an audio signal; and using the generated HR filter, filtering the obtained audio signal to generate a left audio signal for a left side or a right audio signal for a right side.

2. The method of claim 1, the method further comprising:

after obtaining the shape metadata which indicates how to obtain the converted version of said one or more compact representations of said one or more HR filter model basis functions, obtaining from a storage medium first data corresponding to said one or more compact representations of said one or more HR filter model basis functions, wherein the first data is obtained in a predefined manner such that the converted version of said one or more compact representations of the said one or more HR filter model basis functions is obtained.

3. The method of claim 2, wherein obtaining the first data in the predefined manner includes (i) obtaining the first data in a predefined sequence and/or (ii) obtaining the first data partially.

4. The method of claim 1, the method comprising:

receiving second data which identifies said one or more compact representations of said one or more HR filter model basis functions; and providing the received second data for storing in a storage medium, wherein obtaining HR filter model basis function shape data which identifies the converted version of said one or more compact representations of said one or more HR filter model basis functions comprises reading from the storage medium the stored second data in a predefined manner.

5. The method of claim 1, the method further comprising:

obtaining rendering metadata which indicates a particular direction or location to be evaluated; and based on the obtained rendering metadata, identifying a sample point related to the particular direction or location to be evaluated.

6. The method of claim 1, wherein said one or more compact representations of said one or more HR filter model basis functions indicate shapes of non-zero parts of said one or more HR filter model basis functions, and the shapes of said non-zero parts of said one or more HR filter model basis functions are symmetric or mirrored with respect to shapes of another non-zero parts of said one or more HR filter model basis functions.

7. The method of claim 1, wherein the shape metadata comprises any one or combination of the following information:

(i) the number of said one or more HR filter model basis functions;

(ii) starting point of each said one or more HR filter model basis functions;

(iii) one or more shape indices each identifying a particular shape to use for HR filter generation;

(iv) a shape resampling factor for one or more HR filter model basis functions of said one or more HR filter model basis functions;

(v) a flipping indicator for one or more HR filter model basis functions of said one or more HR filter model basis functions, wherein the flipping indictor indicates whether to obtain a flipped version of said one or more compact representations of said one or more HR filter model basis functions stored in the storage medium;

(vi) a HR filter model basis function structure; and (vii) a width of a non-zero part of each HR filter model basis function of said one or more HR filter model basis functions.

8. An apparatus for representing an audio object in an extended reality scene, the apparatus comprising:

a storage unit; and processing circuitry coupled to the storage unit, and wherein the apparatus is configured to:

obtain shape metadata which indicates whether to obtain a converted version of one or more compact representations of one or more head-related (HR) filter model basis functions, said compact representations indicating shapes of non-zero parts of said one or more HR filter model basis functions and the converted version of the one or more compact representations being a flipped or mirrored version and/or a sub-sampled version of said compact representations;

obtain HR filter model basis function shape data which identifies (i) said one or more compact representations of said one or more HR filter model basis functions or (ii) the converted version of said one or more compact representations of said one or more HR filter model basis functions;

based on the obtained shape metadata and the obtained HR filter model basis function shape data, generate an HR filter as a vector which is a weighted sum of one or more HR filter model basis vectors, by an HR filter generator using (i) said one or more compact representations of said one or more HR filter model basis functions and/or (ii) the converted version of said one or more compact representations of said one or more HR filter model basis functions;

obtaining an audio signal; and using the generated HR filter, filtering the obtained audio signal to generate a left audio signal for a left side or a right audio signal for a right side.

9. The method of claim 8, the method further comprising:

after obtaining the shape metadata which indicates how to obtain the converted version of said one or more compact representations of said one or more HR filter model basis functions, obtaining from a storage medium first data corresponding to said one or more compact representations of said one or more HR filter model basis functions, wherein the first data is obtained in a predefined manner such that the converted version of said one or more compact representations of the said one or more HR filter model basis functions is obtained.

10. The method of claim 9, wherein obtaining the data in the predefined manner includes (i) obtaining the first data in a predefined sequence and/or (ii) obtaining the first data partially.

11. The method of claim 8, the method comprising:

receiving second data which identifies said one or more compact representations of said one or more HR filter model basis functions; and providing the received second data for storing in a storage medium, wherein obtaining HR filter model basis function shape data which identifies the converted version of said one or more compact representations of said one or more HR filter model basis functions comprises reading from the storage medium the stored second data in a predefined manner.

12. The method of claim 8, the method further comprising:

obtaining rendering metadata which indicates a particular direction or location to be evaluated; and based on the obtained rendering metadata, identifying a sample point related to the particular direction or location to be evaluated.

13. The method of claim 8, wherein said one or more compact representations of said one or more HR filter model basis functions indicate shapes of non-zero parts of said one or more HR filter model basis functions, and the shapes of said non-zero parts of said one or more HR filter model basis functions are symmetric or mirrored with respect to shapes of another non-zero parts of said one or more HR filter model basis functions.

14. The method of claim 8, wherein the shape metadata comprises any one or combination of the following information:

(i) the number of said one or more HR filter model basis functions;

(ii) starting point of each said one or more HR filter model basis functions;

(iii) one or more shape indices each identifying a particular shape to use for HR filter generation;

(iv) a shape resampling factor for one or more HR filter model basis functions of said one or more HR filter model basis functions;

(v) a flipping indicator for one or more HR filter model basis functions of said one or more HR filter model basis functions, wherein the flipping indictor indicates whether to obtain a flipped version of said one or more compact representations of said one or more HR filter model basis functions stored in the storage medium;

(vi) a HR filter model basis function structure; and (vii) a width of a non-zero part of each HR filter model basis function of said one or more HR filter model basis functions.

* * * * *